(12) United States Patent
Lee et al.

(10) Patent No.: US 10,298,739 B2
(45) Date of Patent: May 21, 2019

(54) METHOD AND APPARATUS FOR TRANSMITTING INTEGRATED MESSAGES

(71) Applicant: Samsung Electronics Co., Ltd., Gyeonggi-do (KR)

(72) Inventors: Je Min Lee, Gyeonggi-do (KR); Jung Wook Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/078,090

(22) Filed: Mar. 23, 2016

(65) Prior Publication Data

US 2016/0286027 A1    Sep. 29, 2016

(30) Foreign Application Priority Data

Mar. 23, 2015  (KR) ........................ 10-2015-0040024

(51) Int. Cl.
*H04W 4/12* (2009.01)
*H04L 12/58* (2006.01)
*H04M 1/725* (2006.01)

(52) U.S. Cl.
CPC ........ *H04M 1/72552* (2013.01); *H04L 51/06* (2013.01); *H04L 51/066* (2013.01); *H04L 51/30* (2013.01); *H04L 51/36* (2013.01); *H04W 4/12* (2013.01); *H04L 51/063* (2013.01)

(58) Field of Classification Search
CPC ..... H04M 1/72552; H04W 4/12; H04L 51/06; H04L 51/063; H04L 51/066; H04L 51/30; H04L 51/36

USPC ......... 455/412.1–414.2, 418–420, 46, 552.1, 455/550.1, 67.11, 67.13, 566; 370/328, 370/338, 260
See application file for complete search history.

(56) References Cited

U.S. PATENT DOCUMENTS 6,438,215 B1    8/2002  Skladman et al.
7,295,657 B1 *  11/2007 Keohane ................. H04L 51/04
                                                      370/352

(Continued)

FOREIGN PATENT DOCUMENTS

EP         2 249 590 A2    11/2010
EP         2 493 166 A1     8/2012
KR    10-2014-0108351 A     9/2014

OTHER PUBLICATIONS

European Search Report dated Aug. 26, 2016.

*Primary Examiner* — Babar Sarwar
(74) *Attorney, Agent, or Firm* — Cha & Reiter, LLC

(57) ABSTRACT

An electronic device comprising: a communication module; a memory; at least one processor operatively coupled to the memory, configured to: display, on the display, a user interface of a messaging application; detect an input indicating a destination telephone number; transmit, via the communication module, a first message comprising a first content by using the destination telephone number and a first protocol; receive, via the communication module, an error message indicating a transmission failure of the first message; and transmit, via the communication module, a second message comprising a second content at least a part of which is the same as the first content, by using the destination telephone number and a second protocol that is different from the first protocol.

18 Claims, 17 Drawing Sheets

(56) References Cited

U.S. PATENT DOCUMENTS

| | | | | |
|---|---|---|---|---|
| 7,502,345 B2* | 3/2009 | Aaltonen | H04W 4/12 | 370/331 |
| 7,802,010 B1* | 9/2010 | Oehrke | H04L 51/30 | 709/225 |
| 8,014,397 B1* | 9/2011 | Zaghloul | H04L 43/028 | 370/389 |
| 8,141,140 B2* | 3/2012 | Wenzel | H04L 63/0815 | 713/182 |
| 8,331,963 B1* | 12/2012 | Lin | H04L 51/36 | 455/435.1 |
| 8,391,136 B1* | 3/2013 | Eidelson | H04L 51/32 | 370/228 |
| 8,780,703 B1 | 7/2014 | Eidelson et al. | | |
| 9,401,939 B2* | 7/2016 | Kanda | H04L 65/403 | |
| 9,451,427 B1* | 9/2016 | Hoelzle | H04W 4/14 | |
| 2002/0110116 A1* | 8/2002 | Aaltonen | H04W 4/12 | 370/352 |
| 2003/0012348 A1 | 1/2003 | Skladman et al. | | |
| 2003/0040316 A1* | 2/2003 | Stanforth | H04L 45/02 | 455/445 |
| 2004/0199649 A1* | 10/2004 | Tarnanen | H04L 29/06 | 709/230 |
| 2004/0203581 A1* | 10/2004 | Sharon | G06Q 30/02 | 455/406 |
| 2005/0031093 A1 | 2/2005 | Skladman et al. | | |
| 2006/0200568 A1* | 9/2006 | Kim | H04L 51/38 | 709/227 |
| 2007/0073891 A1* | 3/2007 | Foltan | H04M 7/1255 | 709/230 |
| 2007/0293250 A1* | 12/2007 | Kim | H04H 60/80 | 455/466 |
| 2008/0317010 A1* | 12/2008 | Naqvi | H04L 65/1016 | 370/355 |
| 2009/0181702 A1* | 7/2009 | Vargas | H04L 51/14 | 455/466 |
| 2011/0047233 A1 | 2/2011 | Park et al. | | |
| 2011/0173488 A1* | 7/2011 | Blumrich | G06F 11/1438 | 714/4.1 |
| 2011/0176539 A1* | 7/2011 | Cao | H04L 51/24 | 370/352 |
| 2011/0207484 A1* | 8/2011 | Karnam Holal | H04L 51/16 | 455/466 |
| 2012/0176908 A1* | 7/2012 | Lee | H04L 1/188 | 370/241 |
| 2012/0179531 A1* | 7/2012 | Kim | G06Q 30/0225 | 705/14.26 |
| 2012/0225652 A1* | 9/2012 | Martinez | H04M 3/42374 | 455/435.1 |
| 2013/0137408 A1* | 5/2013 | Buschner | H04Q 3/0029 | 455/415 |
| 2013/0301529 A1* | 11/2013 | Lindsay | H04W 4/12 | 370/328 |
| 2014/0108577 A1 | 4/2014 | Park et al. | | |
| 2014/0134978 A1* | 5/2014 | Zitnik | H04L 69/08 | 455/411 |
| 2014/0155111 A1* | 6/2014 | Yang | G06F 3/0486 | 455/466 |
| 2014/0308920 A1* | 10/2014 | Bendi | H04W 12/08 | 455/410 |
| 2014/0375747 A1 | 12/2014 | Martinez et al. | | |
| 2015/0019659 A1 | 1/2015 | Eidelson et al. | | |
| 2015/0066641 A1* | 3/2015 | Dudley | G06Q 30/0261 | 705/14.51 |
| 2015/0373200 A1* | 12/2015 | Zitnik | H04L 51/38 | 370/260 |
| 2016/0149836 A1* | 5/2016 | Narayanan | H04L 51/04 | 709/206 |
| 2016/0255490 A1* | 9/2016 | Mufti | H04L 65/1016 | 370/328 |
| 2016/0286027 A1* | 9/2016 | Lee | H04M 1/72552 | |

\* cited by examiner

METHOD AND APPARATUS FOR TRANSMITTING INTEGRATED MESSAGES

CLAIM OF PRIORITY

This application claims the benefit under 35 U.S.C. § 119(a) of a Korean patent application filed on Mar. 23, 2015 in the Korean Intellectual Property Office and assigned Serial number 10-2015-0040024, the entire disclosure of which is hereby incorporated by reference.

TECHNICAL FIELD

The present disclosure relates to electronic devices, in general, and more particularly to a method and apparatus for transmitting integrated messages.

BACKGROUND

Earlier versions of the Rich Communications Suite (RCS) (e.g., RCS BlackBird (BB)) enable a server to check RCS capability of an electronic device of the other party (or an electronic device of a receiving side) and transmit an IP multimedia subsystem (IMS)-based chat message or file.

In RCS 5.x and later versions, since a server supports converged IP messaging (CPM), an electronic device of a transmitting side may only check its own capability so as to transmit an IMS-based chat message or file to an electronic device of a receiving side if the electronic device of the transmitting side is capable of performing RCS transmission. In detail, the server which supports RCS 5.x may transmit, in RCS format, data received from the electronic device of the transmitting side if the electronic device of the receiving side supports the RCS, or may convert the data received from the electronic device of the transmitting side into a legacy message such as a short messaging service (MMS) message or multimedia messaging service (MMS) message using an interworking function (IWF) of the server and then may transmit the legacy message.

FIG. 1A is a diagram of an example of a message transmission environment, according to an embodiment of the present disclosure. More particularly, FIG. 1A conceptually illustrates a process of RCS message transmission in an environment supporting the RCS BB. If a number of a receiving-side electronic device 102 is input to a messaging application of a transmitting-side electronic device 101, the number of the receiving-side electronic device 102 is transferred to a network 100 (e.g., a base station or a server) (stage 1). The network 100 then sends, to the receiving-side electronic device 102, a query on whether the RCS is supported thereby (stage 2), and receives a response to the query (stage 3). The transmitting-side electronic device 101 then obtains, from the network 100, information on whether the receiving-side electronic device 102 supports the RCS (stage 4). Then, the transmitting-side electronic device 101 transmits a message of an RCS format if the receiving-side electronic device 102 supports the RCS or transmits a message of an SMS or MMS format if the receiving-side electronic device 102 does not support the RCS (stage 5). However, the RCS BB method has a limitation in that the transmitting-side electronic device 101 is unable to determine a transmission formation of a message for itself and should be dependent on information received from a server (or the network 100).

FIG. 1B is a diagram of an example of a message transmission environment, according to an embodiment of the present disclosure. More particularly, FIG. 1B conceptually illustrates a process of RCS message transmission in an environment supporting RCS 5.x. The transmitting-side electronic device 101 only checks its own RCS support capability, and transmits data in RCS format if it supports the RCS (stage 1). The network 100 sends, to the receiving-side electronic device 102, a query on whether the RCS is supported thereby (stage 2), and receives a response to the query (stage 3). If the receiving-side electronic device 102 supports the RCS, the RCS-format data transmitted from the transmitting-side electronic device 101 may be transmitted to the receiving-side electronic device 101, but, if the receiving-side electronic device 102 does not support the RCS, the network 100 converts the data into a legacy message (e.g., SMS/MMS) format using the IWF and transmits the converted data (stage 4).

However, since a message type, a file type, a file size, etc. that is supported by the RCS format are different from those defined by the SMS/MMS format, conversion failure may occur. For example, file transfer (FT) of a 10 megabyte-file is enabled in the RCS, but a transferable file size may be limited to 1 MB in the MMS, and thus conversion of a file transmitted as an RCS message from the transmitting-side electronic device 101 into the MMS format fails if the size of the file is too large. For another example, the MMS enables attachment of files such as images, videos, etc., but do not support attachment of files of some formats such as xml, ppt, etc. If the transmitting-side electronic device 101 transmits such files using the RCS, conversion of the files into the MMS format fails. As described above, when the server that supports RCS 5.x fails to convert an IMS-based chat message or FT message into a legacy message using the legacy IWF, the server is unable to transmit an error message to the receiving-side electronic device 102 and transmits it to the transmitting-side electronic device 101. When such an error occurs, since there is no definition for retransmitting a message from the transmitting-side electronic device 101, completion of message transmission to the receiving-side electronic device 102 is not ensured.

SUMMARY

According to aspects of the disclosure, an electronic device is provided comprising: a display; a communication module; a memory; at least one processor operatively coupled to the memory, configured to: display, on the display, a user interface of a messaging application; detect an input indicating a destination telephone number; transmit, via the communication module, a first message comprising a first content by using the destination telephone number and a first protocol; receive, via the communication module, an error message indicating a transmission failure of the first message; and transmit, via the communication module, a second message comprising a second content at least a part of which is the same as the first content, by using the destination telephone number and a second protocol that is different from the first protocol.

According to aspects of the disclosure, a method is provided for use in an electronic device, comprising: displaying, by the electronic device, a user interface of a messaging application; detecting, by the electronic device, an input indicating a destination telephone number; transmitting, by the electronic device, a first message comprising a first content by using the destination telephone number and a first protocol; receiving, by the electronic device, an error message indicating a transmission failure of the first message; and transmitting, by the electronic device, a second message comprising a second content at least a part of which is the same as the first content, the second message being transmitted by using the destination telephone number and a second protocol that is different from the first protocol.

According to aspects of the disclosure, a method is provided for use in an electronic device, comprising: transmitting a first message to an external electronic device, wherein the first message includes a Rich Communication Suite (RCS) message; receiving an error message indicating a transmission failure of the first message; converting the first message into a second message in response to the error message; and transmitting the second message.

According to aspects of the disclosure, a Rich Communication Suite (RCS) system is provided comprising: a message module configured to receive an RCS file transfer (FT) message from a first electronic device and transmit the FT message to a second electronic device; and an interworking function (IWF) module configured to convert the FT message into a multimedia messaging service (MMS) message when the second electronic device does not support RCS, wherein, if the IWF module fails to convert the FT message into the MMS message, the IWF module converts the FT message into the MMS message by performing at least one of a compressing, a splitting, or a resolution change of content included in the FT message.

DETAILED DESCRIPTION

Figure 1A:
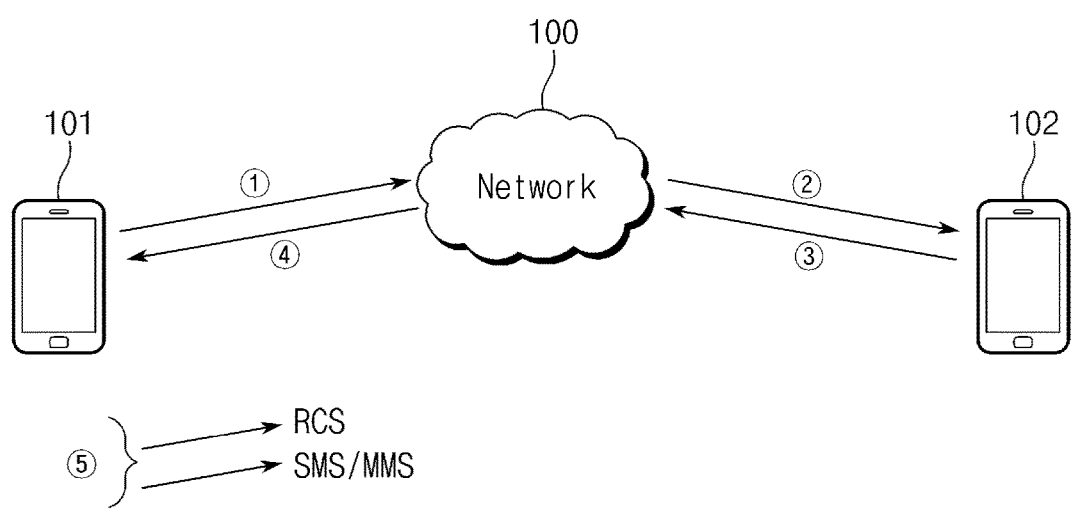
FIG. 1A is a diagram of an example of a message transmission environment, according to the prior art.
Figure 1B:
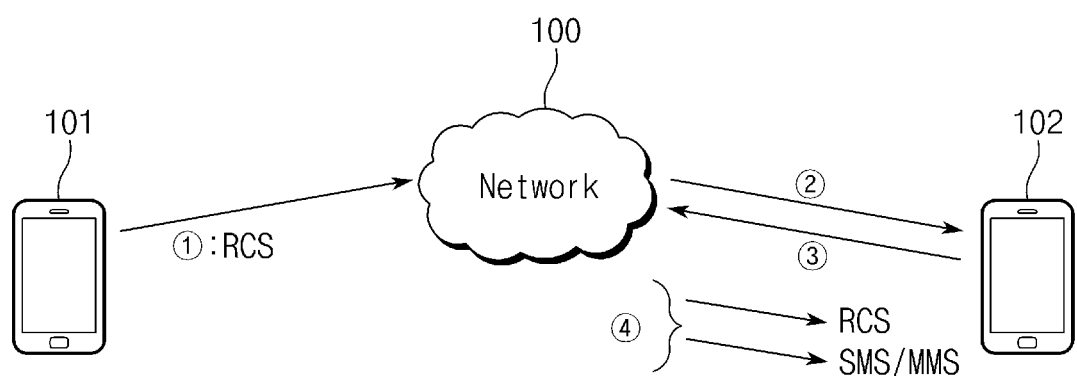
FIG. 1B is a diagram of an example of a message transmission environment, according to the prior art.

Hereinafter, various embodiments of the present disclosure will be described in detail with reference to the accompanying drawings. However, it should be understood that the present disclosure is not limited to specific embodiments, but rather includes various modifications, equivalents and/or alternatives of various embodiments of the present disclosure. Regarding the description of the drawings, like reference numerals may refer to like elements.

The term "have", "may have", "include", "may include", "comprise", or the like used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together. For example, the term "A or B", "at least one of A and B", or "at least one of A or B" may indicate all the cases of (1) including at least one A, (2) including at least one B, and (3) including at least one A and at least one B.

The term "first", "second", or the like used herein may modify various elements regardless of the order and/or priority thereof, and is used only for distinguishing one element from another element, without limiting the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" used herein may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a CPU or an application processor) for executing at least one software program stored in a memory device to perform a corresponding operation.

The terminology used herein is only used for describing specific embodiments and is not intended to limit the scope of other embodiments. The terms of a singular form may include plural forms unless otherwise specified. The terms used herein, including technical or scientific terms, have the same meanings as understood by those skilled in the art. Commonly-used terms defined in a dictionary may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. According to various embodiments of the present disclosure, the wearable device may include at least one of an accessory device (e.g., a watch, a ring, a bracelet, an anklet, a necklace, glasses, a contact lens, a head-mounted device (HDM)), a textile- or clothing-integrated-type device (e.g., an electronic apparel), a body-attached-type device (e.g., a skin pad or a tattoo), or a bio-implantable-type device (e.g., an implantable circuit).

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

Figure 2:
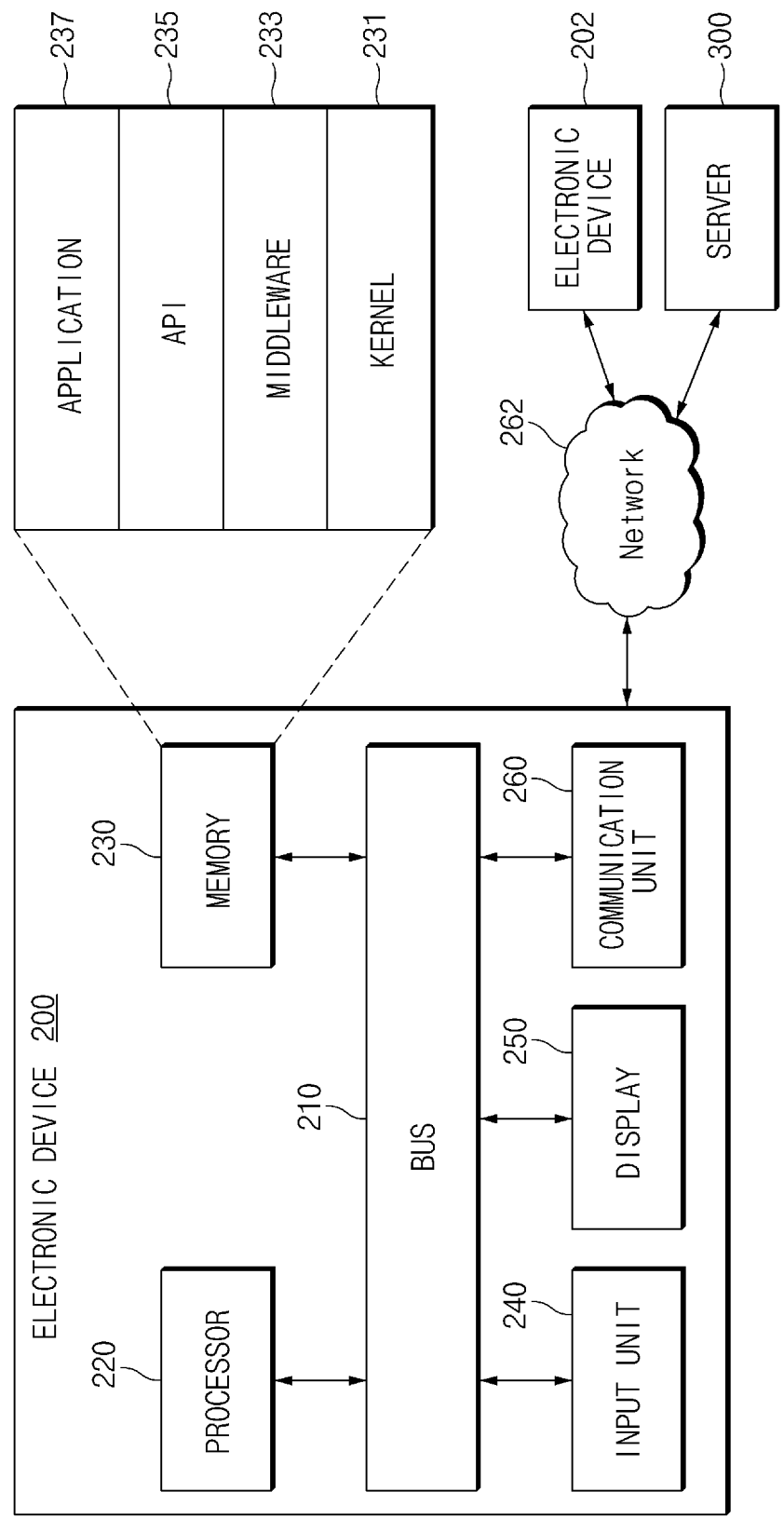
FIG. 2 is a diagram of an example of an electronic device, according to an embodiment of the present disclosure.

FIG. 2 is a diagram of an example of an electronic device, according to an embodiment of the present disclosure.

An electronic device 200 may include a bus 210, a processor 220, a memory 230, an input unit 240, a display 250, and a communication unit 260. In some various embodiments of the present disclosure, at least one of the foregoing elements may be omitted or another element may be added to the electronic device 200.

The bus 210 may include a circuit for connecting the above-mentioned elements 210 to 260 to each other and transferring communications (e.g., control messages and/or data) among the above-mentioned elements.

The processor 220 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In some implementations, the processor 220 may include at least one of a central processing unit (CPU), an application processor (AP), or a communication processor (CP). The processor 220 may perform data processing or an operation for communication and/or control of at least one of the other elements of the electronic device 200.

The memory 230 may include any suitable type of volatile or non-volatile memory, such as Random-access Memory (RAM), Read-Only Memory (ROM), Network Accessible Storage (NAS), cloud storage, a Solid State Drive (SSD), etc. The memory 230 may store instructions or data related to at least one of the other elements of the electronic device 200. According to an embodiment of the present disclosure, the memory 230 may store software and/or a program. The program may include, for example, a kernel 231, a middleware 233, an application programming interface (API) 235, and/or an application program (or an "application") 237. At least a portion of the kernel 231, the middleware 233, or the API 235 may be referred to as an operating system (OS).

The memory 230 may store instructions or data that, when executed, cause the processor 220 to perform an operation related to message writing, rich communication suite (RCS) check, and/or message conversion. For example, the memory 230 may store instructions that cause the processor 220 to display a message input screen on the display 250 and configure a message according to a message input (e.g., a touch input, a voice input, a file attachment input, or the like) received by the input unit 240. For example, instructions for implementing a message writing function or a message writing module may be stored in the memory 230.

Furthermore, the memory 230 may store instructions for checking an RCS message sending ability of the electronic device 200. For example, the processor 220 may detect whether the electronic device 200 supports RCS. For example, the processor 220 may check existence of an RCS feature of the electronic device 200 in an IP multimedia subsystem (IMS) framework when booting the electronic device 200 is completed, may send a request for an RCS enable value to a network 262 (e.g., a server), and may store a response to the request in the memory 230. For example, the processor 220 may determine, based on the RCS capability, whether to transmit a message written by a user as an IMS-based chat message or file transfer (FT) message or as a legacy message such as a short messaging service (MMS)/multimedia messaging service (MMS) message. In other words, instructions for implementing an RCS check function or an RCS check module may be stored in the memory 230.

Furthermore, the memory 230 may store instructions for converting an IMS-based (RCS-type) message into a legacy message if a transfer error occurs in a server and causes a fallback situation. The electronic device 200 may provide a message conversion module or a message conversion function based on such instructions.

The kernel 231 may control or manage system resources (e.g., the bus 210, the processor 220, the memory 230, or the like) used to perform operations or functions of other programs (e.g., the middleware 233, the API 235, or the application program 237). Furthermore, the kernel 231 may provide an interface for allowing the middleware 233, the API 235, or the application program 237 to access individual elements of the electronic device 200 in order to control or manage the system resources.

The middleware 233 may serve as an intermediary so that the API 235 or the application program 237 communicates and exchanges data with the kernel 231.

Furthermore, the middleware 233 may handle one or more task requests received from the application program 237 according to a priority order. For example, the middleware 233 may assign at least one application program 237 a priority for using the system resources (e.g., the bus 210, the processor 220, the memory 230, or the like) of the electronic device 200. For example, the middleware 233 may handle the one or more task requests according to the priority assigned to the at least one application, thereby performing scheduling or load balancing on the one or more task requests.

The API 235, which is an interface for allowing the application 237 to control a function provided by the kernel 231 or the middleware 233, may include, for example, at least one interface or function (e.g., instructions) for file control, window control, image processing, character control, or the like. The input unit 240 may serve as an interface for transferring an instruction or data input from a user or another external device to (an)other element(s) of the electronic device 200. Furthermore, the input unit 240 may be replaced with an input/output interface, and, in this case, the input/output interface may output an instruction or data received from (an)other element(s) of the electronic device 200 to the user or another external device.

The display 250 may include, for example, a liquid crystal display (LCD), a light-emitting diode (LED) display, an organic light-emitting diode (OLED) display, a microelectromechanical systems (MEMS) display, or an electronic paper display. The display 250 may present various content (e.g., a text, an image, a video, an icon, a symbol, or the like)

to the user. The display 250 may include a touch screen, and may receive a touch, gesture, proximity or hovering input from an electronic pen or a part of a body of the user.

The communication unit 260, for example, may set communications between the electronic device 200 and another electronic device 202. For example, the communication unit 260 may be connected to the network 262 through wireless communications or wired communications so as to communicate with the other electronic device 202. For example, the network 262 may include various communication networks such as 2G/3G networks, 4G networks, long-term evolution (LTE) networks, LTE-Advanced (LTE-A) networks, etc., or servers or base stations supporting the communication networks.

The wireless communications may employ at least one of cellular communication protocols such as LTE, LTE-A, code division multiple access (CDMA), wideband CDMA (WCDMA), universal mobile telecommunications system (UMTS), wireless broadband (WiBro), or global system for mobile communications (GSM). The network may include at least one of telecommunications networks, for example, a computer network (e.g., a LAN or WAN), the Internet, or a telephone network.

Figure 3:
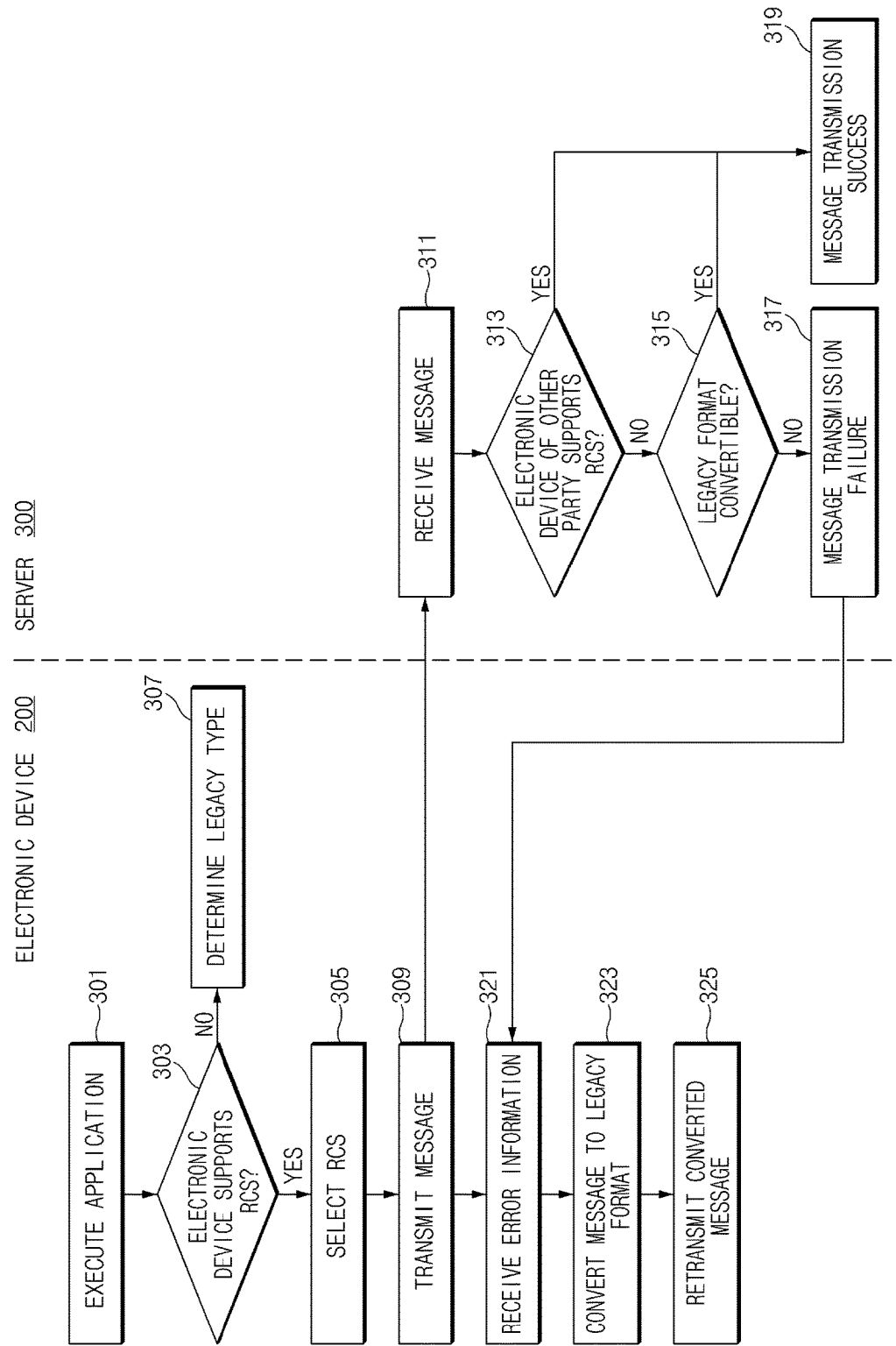
FIG. 3 is a flowchart of an example of a process, according to an embodiment of the present disclosure.

FIG. 3 is a flowchart of an example of a process, according to an embodiment of the present disclosure. Referring to FIG. 3, in operation 301, the electronic device 200 may execute an application for sending a message. In operation 303, the electronic device 200 may determine whether the electronic device 200 supports RCS. If the electronic device 200 supports RCS, the electronic device 200 may select to use RCS for the transmission of messages, in operation 305. If the electronic device 200 does not support RCS, the electronic device 200 may select a legacy messaging protocol, such as SMS or MMS in operation 307.

In operation 309, the electronic device 200 may transmit an RCS message to a server 300. Upon receiving the message from the electronic device 300, the server 300 may perform an operation for transferring the message to another destination (e.g., an electronic device 202) specified by the electronic device 200. If the message is received in operation 311, the server 300 may determine whether the electronic device of the other party supports RCS in operation 313. For example, the server 300 may send, to the electronic device of the other party, a request for identifying whether RCS is supported, and may determine whether RCS is supported based on a response that is received from the electronic device of the other party. If the electronic device of the other party supports RCS, the server 300 may successfully deliver the RCS message in operation 319.

If the electronic device of the other party does not support RCS or is unable to use RCS at the moment, the server 300 may determine whether the RCS message received from the electronic device 200 is convertible to a legacy format (e.g., SMS or MMS) in operation 315. For example, when an FT message sent from the electronic device 200 exceeds a transfer size limit of MMS, the server 300 may determine that message conversion is not possible.

When the conversion into a legacy-type message is possible, in operation 319, the server 300 may successfully deliver the legacy-type message obtained as a result of the conversion and the process may be ended. When the conversion to a legacy-type message is not possible (conversion failure), the server 300 may fail to send the message and may transmit error information indicating the message transfer failure to the electronic device 317 in operation 317.

Although FIG. 3 illustrates an example in which an error is caused by a maximum transfer size difference between an RCS format and an MMS format, the server 300 may experience message transfer failure for various reasons (even when the electronic device of the other party supports RCS or the conversion into a legacy type is possible, message transfer failure may occur at the time of actual transfer for known or unknown reasons), and error information generated in various instances may be transferred to the electronic device 200.

The electronic device 200 may receive the error information in operation 321. An embodiment in which errors are differently handled according to an error type is described below with reference to FIG. 8. The example of FIG. 3 rests on the assumption that an error is caused by failure in conversion from an RCS message to a legacy message in the server 300.

In operation 323, the electronic device 200 may convert the RCS message transmitted in operation 309 to a legacy format. For example, a message conversion module may extract recipient information, a body text, attached file information, and the like from the RCS message, and may encapsulate the extracted information items into a legacy message, such as an SMS or MMS message. In operation 325, the electronic device 200 may retransmit the converted message to the electronic device of the other party via the server 300 or an additional legacy network.

According to various embodiments of the present disclosure, if the electronic device 200 receives the error information in operation 321, the electronic device 200 may provide a notification indicating that a transfer error has occurred with respect to the message attempted to be sent. For example, in a user interface (UI) in which exchanged messages are displayed in bubbles, the electronic device 200 may display a transfer error icon on a bubble corresponding to the message on which the transfer error has occurred. Furthermore, the electronic device 200 may provide an interface for resending the message on which the transfer error has occurred. For example, if a touch input is performed on the message with respect to which the transfer error has occurred, or the transfer error indicator is received, the electronic device 200 may perform an operation of resending the message on which the transfer error has occurred. When resending the message with respect to which the transfer error has occurred, the electronic device 200 may transmit the message using the same method as that used for previously transmitting the message on which the transfer error has occurred or using a different method. Alternatively, the electronic device 200 may resend the message according to a preset sequence or condition. For example, when the message on which the transfer error has occurred is an RCS message, the electronic device 200 may determine whether RCS is supported by the electronic device 200 before resending the message, and may resend the message using the RCS protocol if RCS is supported, or, if RCS is not supported, the electronic device 200 may resend the message using another method (e.g., SMS, MMS, or IM). A relevant exemplary user interface is described below with reference to FIG. 4.

Figure 4A:
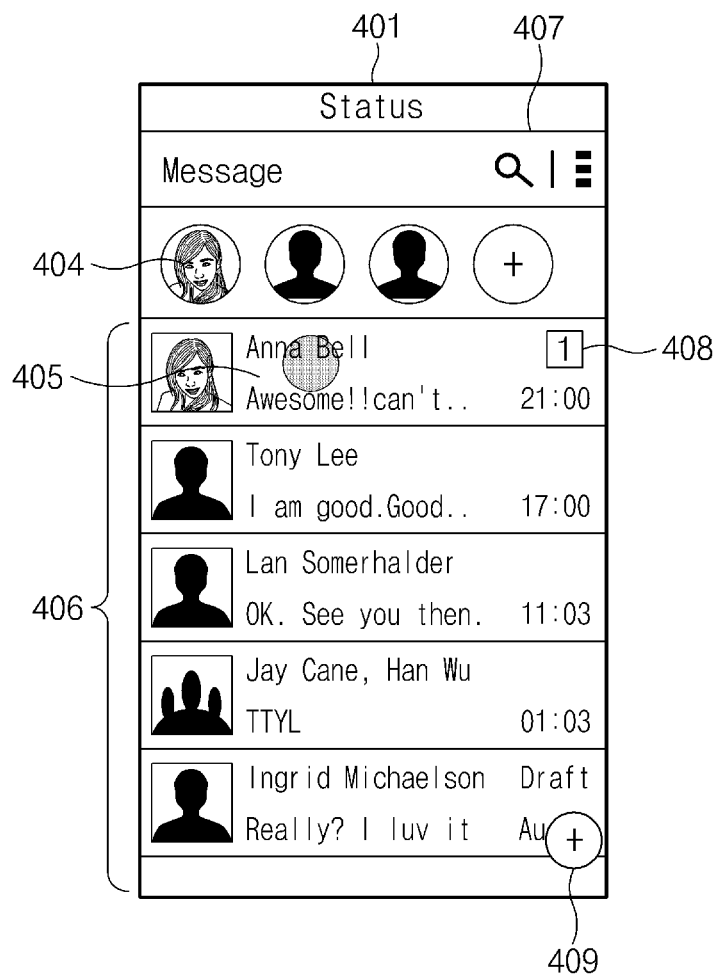
FIG. 4A is a diagram of an example of a user interface, according to an embodiment of the present disclosure.
Figure 4B:
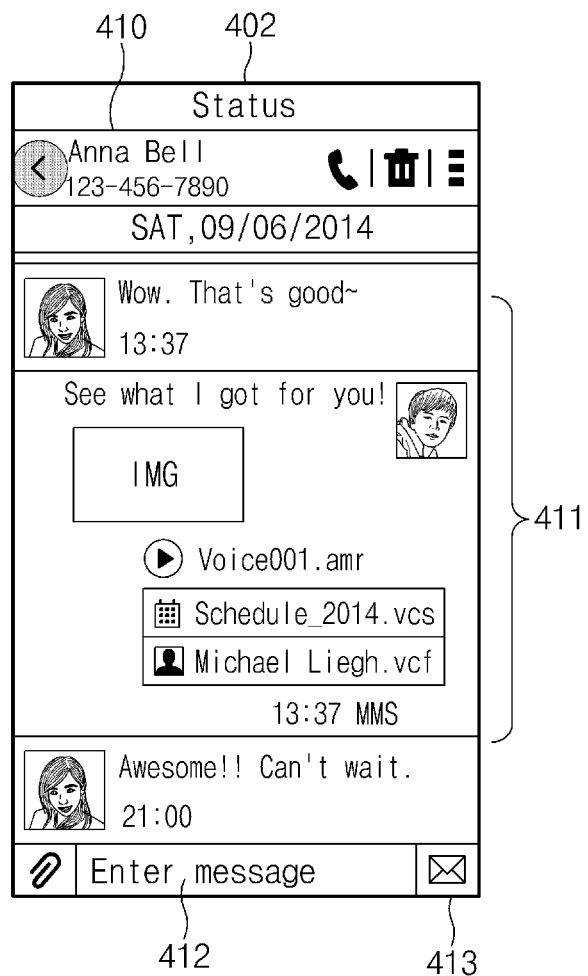
FIG. 4B is a diagram of an example of a user interface, according to an embodiment of the present disclosure.
Figure 4C:
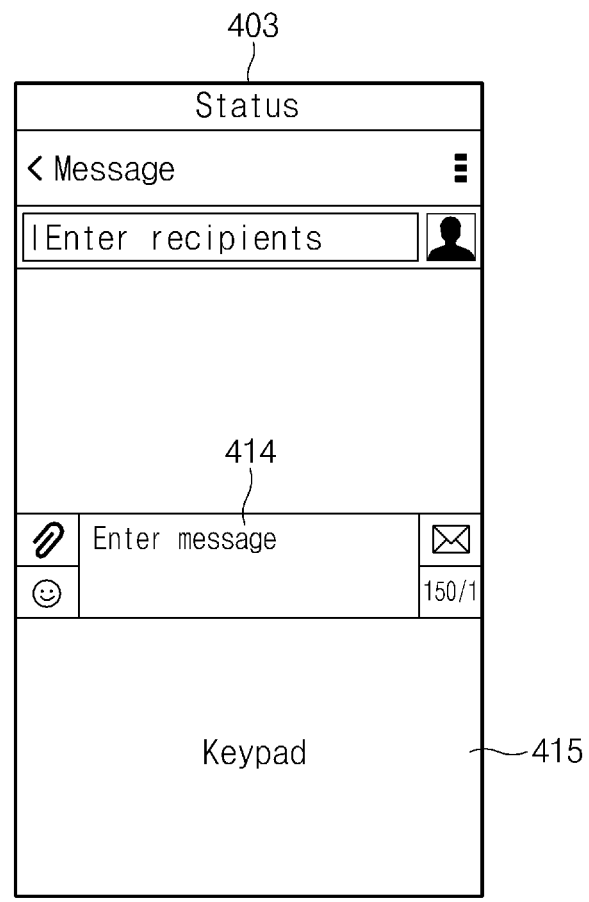
FIG. 4C is a diagram of an example of a user interface, according to an embodiment of the present disclosure.

FIGS. 4A-C illustrate an example of a user interface of an integrated messaging application according to an embodiment of the present disclosure. The integrated messaging application may provide a UI with an integrated environment for at least one of a legacy message (e.g., an SMS message or an MMS message), an RCS message, or an IM message.

More particularly, FIG. 4A illustrates a screen 401 displaying a chat thread. The screen 401 may include a chat partner list 404, a chat thread list 406, a menu interface 407, a new message notification 408, and a new message writing interface 409. The chat partner list 404 may be displayed according to a chat frequency, a recent contact, or a user's setting. The chat partner list 404 may be displayed as an image or a text. For example, an image corresponding to the chat partner list 404 may correspond to an image registered in a contacts list. The contacts list may be stored in the electronic device 200 or an external electronic device. The chat thread list 406 may include at least one of an image or a text representing a chat partner, at least a portion of the contents of a recent message, a time of reception of the recent message, a time of drafting of the recent message, and an indication of whether a message draft exists that has not been sent. The menu interface 407 may include a menu of search, message selection, message deletion, or messaging application setting. The new message notification 408 may display the number of received messages that are not viewed yet. If user's selection occurs on the new message writing interface 409, the electronic device 200 may display a message writing screen 403 in response to the user's selection as illustrated in FIG. 4C.

If a message thread 405 is selected, the electronic device 200 may display message contents exchanged with a chat partner 410 as illustrated in FIG. 4B. As illustrated, the screen shown in FIG. 4B may include a chat partner display region 410, a message contents display region 411, and a message input region 412. The message input region 412 may include an attachment interface, a text or emoticon input interface, and a message sending interface. For example, the message may include at least one of a legacy message, an IM message, or an RCS message. If a message sending icon 413 is selected, a message input into the message input region 412 may be transmitted to the chat partner 410.

The screen shown in FIG. 4C may include a message input region 414 and a soft keypad region 415.

According to various embodiments of the present disclosure, an interface for changing a setting associated with the RCS capability of the electronic device 200 through the integrated messaging application may be provided.

According to various embodiments of the present disclosure, the electronic device 200 which is executing the integrated messaging application may differently display, in the integrated messaging application, an indication of message reception according to a message receiving method. For example, the electronic device 200 may change a speech bubble display form or color or a notification sound or vibration generated upon reception of a message, according to a format corresponding to a received message (e.g., RCS or SMS/MMS).

According to various embodiments of the present disclosure, the integrated messaging application and an RCS-dedicated messaging application may be executed concurrently by the electronic device 200. Furthermore, when the integrated messaging application and the RCS-dedicated messaging application recognize reception of a message and display a notification, if one of the applications displays the message (or a notification that the message is received), the other application may not display the message and/or the notification.

Figure 5:
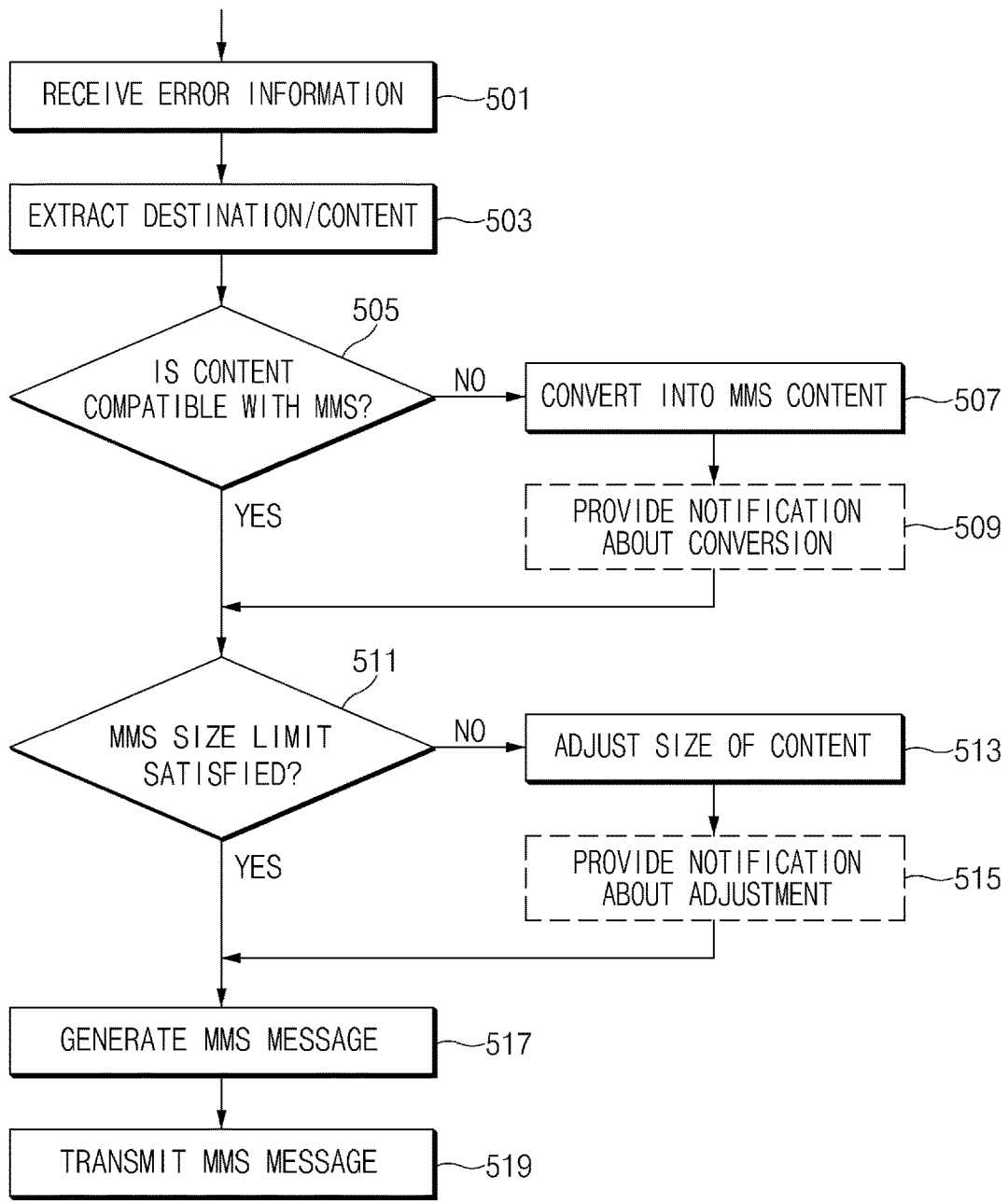
FIG. 5 is a flowchart of an example of a process, according to an embodiment of the present disclosure.

Described below with reference to FIGS. 5 and 6 is a process of converting an RCS message into an MMS message when sending an FT message fails.

FIG. 5 illustrates a process of converting an RCS message into an MMS message according to an embodiment of the present disclosure. FIG. 6 illustrates an exemplary notification screen that may be provided when an RCS message is converted into an MMS message. Descriptions of FIGS. 5, 7, and 8 which overlap with descriptions of operations 301 to 319 of FIG. 3 are not provided below.

In operation 501, the electronic device 200 may receive error information from the server 300. The error information received in operation 501 may indicate that the conversion of a sent FT message into an MMS type has failed. In operation 503, the electronic device 200 may extract destination information (e.g., a name of the other party, a number of the electronic device of the other party, etc.) and may extract content contained in an RCS message in order to configure an MMS message. When the RCS message is an FT message, the extracted content may include an attached file.

In operation 505, the electronic device 200 may determine whether the extracted content has a type that is compatible with the MMS protocol. File types supported by the MMS are limited. For example, image files, audio files, video files, or photo slideshow files may be supported by the MMS.

However, file types such as XML, EXE, and PPT are not supported by the MMS. If it is determined that the extracted content has a type not supported by the MMS, the electronic device 200 may convert the extracted content into MMS content in operation 507 (e.g., content that is compatible with the MMS protocol). For example, the electronic device 200 may convert a video format not supported by the MMS into a format that is supported by the MMS protocol. Additionally or alternatively, when the attached file of the FT message is not supported by the MMS, the electronic device 200 may change an extension of the file into an extension that is supported by the MMS protocol. More particularly, the electronic device 200 (e.g., a message conversion module) may change the extension of the attached file into an extension that is supported by the MMS, and may record a file extension in a prefix text using a file name field among data fields constituting a file. A receiving terminal may restore an original file extension based on the prefix text.

In operation 509, a notification of conversion into an MMS format may be provided. For example, in a screen 610 of FIG. 6A, a notification such as a popup 616 may be provided. The screen 610, for example, may be an integrated messaging UI in which an RCS or IM message and a legacy message are integrated. The screen 610 may include a title 611, a recipient item 612, a previously sent/received message region 613, a current message writing region 614, and a keyboard region 615. If error information indicating message transmission failure is received from the server 300 with respect to a message written on the screen 610 by the user and sent in RCS format, the MMS conversion process of FIG. 5 may be performed. In such instances, a notification that the message is sent after being converted into an MMS format may be provided. An additional message sending fee may not be charged for an RCS-based message since a data network is used for the transmission of the message, but a legacy message such as an SMS or MMS message may be charged a fee according to the number of messages sent, and thus the user may be unable to be aware of occurrence of an unexpected cost. Therefore, a notification such as the popup 616 may be provided to indicate that a written message will be sent in MMS format and inform the user that a fee that may be charged. Although FIG. 5 illustrates that operation 509 is performed after operation 507, operation 509 may be performed at any suitable time, such as before operation 519.

If it is determined in operation 505 that the content has a type that is compatible with the MMS protocol, or the content is converted into a type supported by the MMS protocol in operation 507, it may be determined whether the size of current content satisfies a size limit associated with the MMS protocol in operation 511. For example, when the size limit is 1 MB, and the extracted content has a size which satisfies the size limit, such as a size of 850 KB, the electronic device 200 may automatically generate an MMS message in operation 517. However, when the size of the extracted content is larger than the maximum transfer size of the MMS, the electronic device 200 may perform an operation of resizing the content by compressing or splitting the content or changing a format or resolution of the content in operation 513.

In operation 513, depending on a file type (extension), compression based on a typical compression algorithm may be unable to be performed. In such instances, the electronic device 200 may change the content into a compressible file type (extension) in a similar manner to that described above with respect to operation 507, and may record an original file extension of a compressed file in a file name field.

Additionally or alternatively, in instances in which an audio file or a video file, a data section to be transmitted may be set according to an input from the user or a predefined condition (e.g., a start position, an end position, a playback time, or a data size). For example, it may be determined whether a set section is able to be transmitted, and a result of the determination may be displayed on a display. In the case of a picture or image file, a data section to be transmitted may be set according to an input from the user or a predefined condition (e.g., a position or composition of a subject, a feature of a subject such as a human facial shape, or a center region of a picture or image).

Figure 6A:
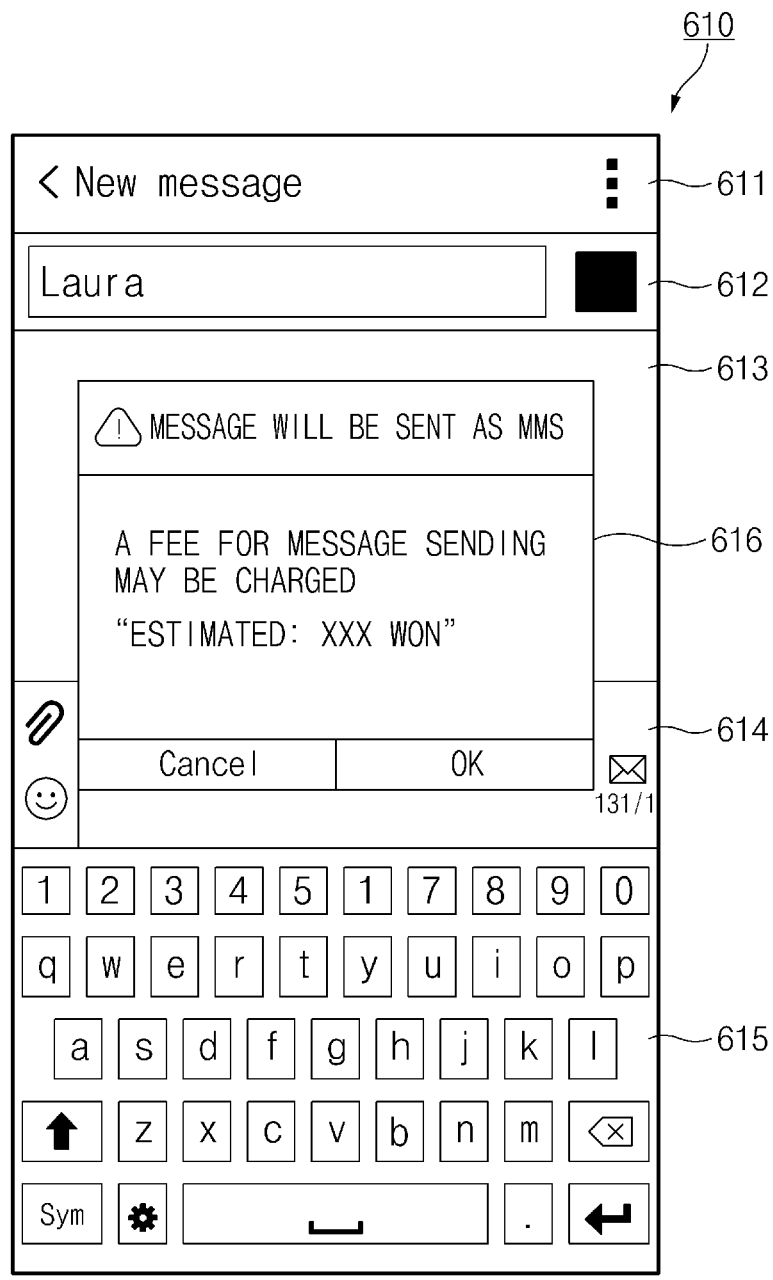
FIG. 6A is a diagram of an example of a user interface, according to an embodiment of the present disclosure.
Figure 6B:
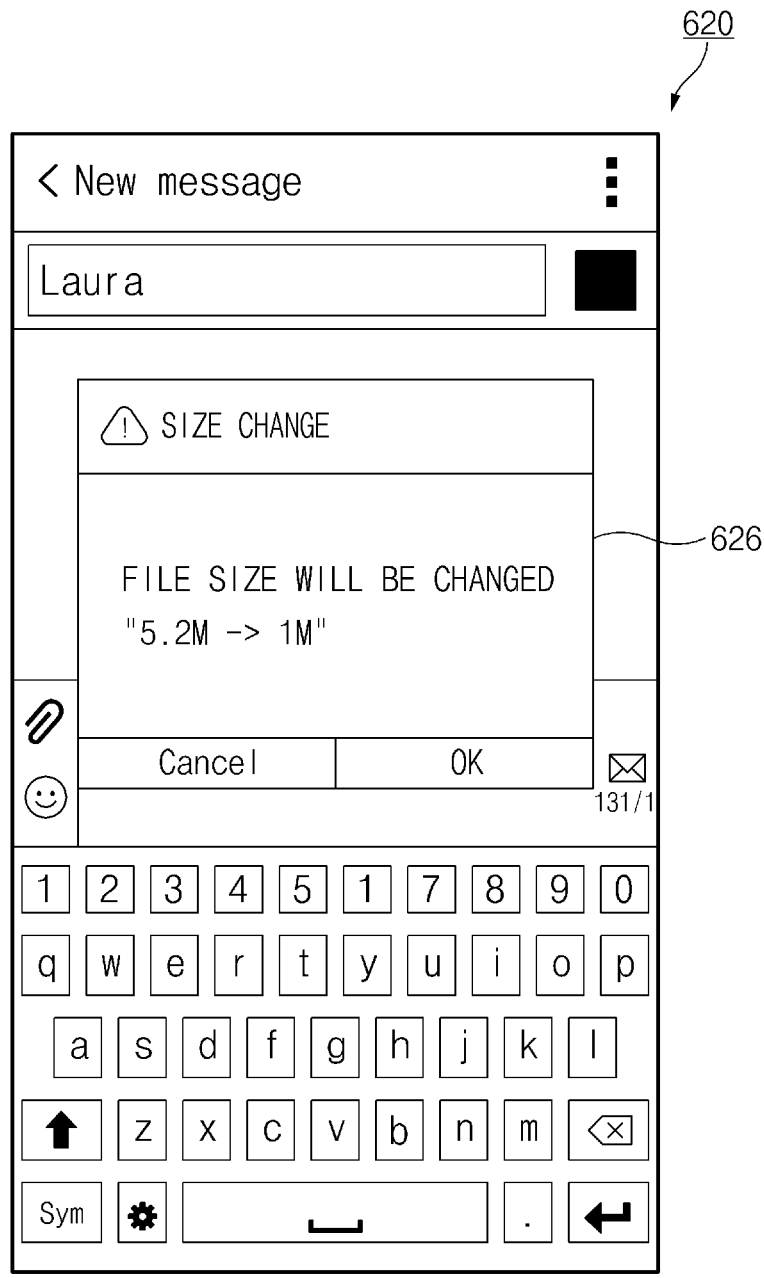
FIG. 6B is a diagram of an example of a user interface, according to an embodiment of the present disclosure.

In general, the user using a communication network is charged a fee according to a data use amount, or the amount of data usable by the user is determined according to a rating system. That is, since the data use amount may be important information for the user or a provider, an appropriate notification may be provided to the user when the data use amount is changed due to file compression or the like. For example, in operation 515, a notification may be provided as illustrated in FIG. 6B. A popup 626 may be output to a screen 620 of FIG. 6B to provide a notification that a file will be changed and information on file sizes of an original file and a changed file.

According to aspects of the disclosure, any suitable type of notification may be provided at operation 515. For example, an indication that a file extension will be changed, an indication that a file resolution will be changed, an indication that a file will be split to be transmitted, an indication indicating a change of a message type into an SMS, MMS or IM message type, or a combination thereof may be provided as a notification.

In operation 517, the electronic device 200 may generate an MMS message including content generated as a result of executing operation 513 (e.g., content whose size is adjusted). In operation 519, the electronic device 200 may retransmit the generated MMS message to another electronic device (for example, via the server 300).

Figure 7:
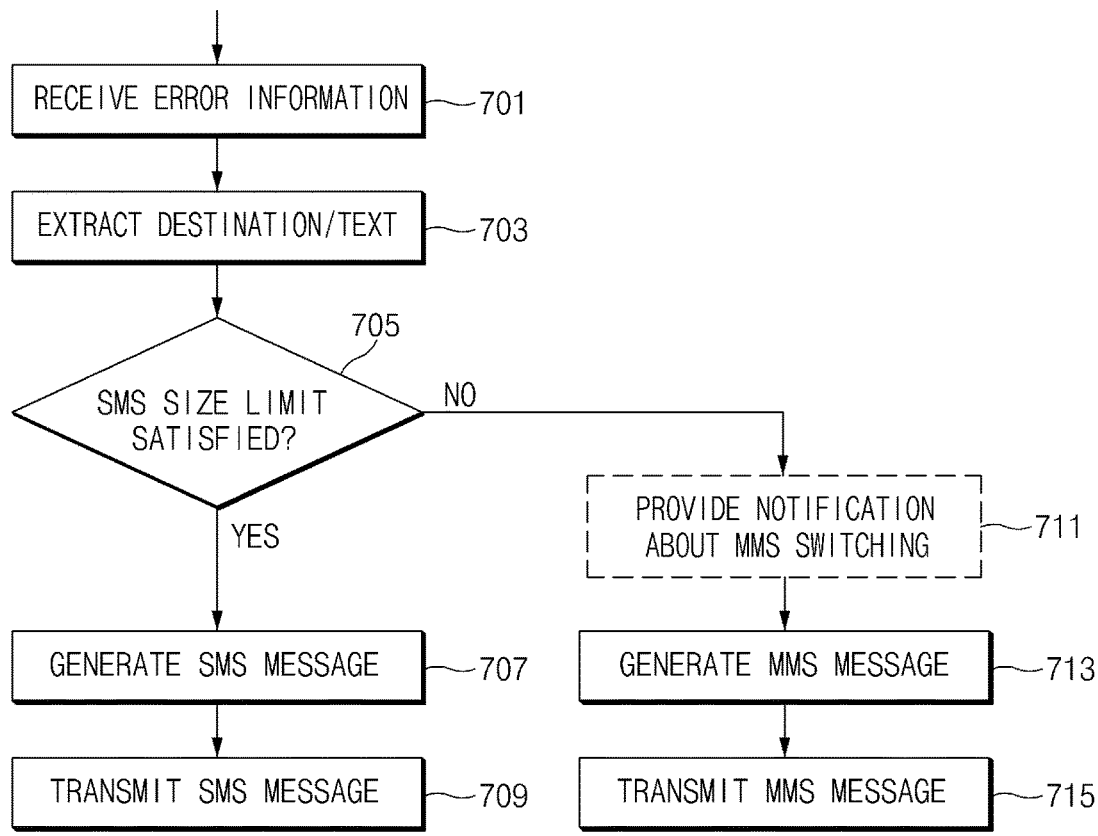
FIG. 7 is a flowchart of an example of a process, according to an embodiment of the present disclosure.

FIG. 7 is a flowchart of an example of a process, according to an embodiment of the present disclosure. More particularly, FIG. 7 illustrates a process of converting an RCS message into an SMS or MMS message. According to aspects of the disclosure, the process of FIG. 5 may be mainly performed when an FT message is sent in RCS format, and the process of FIG. 7 may be mainly performed when a chat message is sent in RCS format.

In operation 701, the electronic device 200 may receive error information from the server 300. The error information received in operation 701 may be different from the error information received in operation 501. When an FT message is sent from the electronic device 200, since the size of the FT message highly possibly exceeds the size limit of the MMS, an error message indicating conversion failure may be received from the server 300. However, when a chat message is sent from the electronic device 200, since the chat message normally has such a size that the chat message is convertible into an SMS or MMS message, a possibility of receiving an error message indicating conversion failure is relatively low. Therefore, the error information received in operation 701 may be related to an error that occurs since the server 300 does not support the legacy IWF or other types of errors. For example, when a server that does not support the IWF receives an RCS chat message from the electronic device 200, but an electronic device of the other party does not support RCS, the server is unable to convert the RCS message to SMS format and may thus transmit relevant error information to the electronic device 200.

In operation 703, the electronic device 200 may extract a destination and a text of the RCS message (e.g., payload). Since the chat message does not have an attached file unlike an FT message, entire content of that message may be text.

In operation 705, the electronic device 200 may determine whether the extracted content satisfies a size limit associated with the SMS protocol. For example, the electronic device 200 may determine whether the message sent in RCS format has a smaller size than 140 bytes that is a typical size limit of the SMS. If a specified criterion (e.g., size limit) is satisfied, the electronic device 200 may generate an SMS message in operation 707, and may transmit the generated SMS message in operation 709. If the criterion is not satisfied, the electronic device 200 may convert the RCS message into an MMS message in operation 713. In some implementations, operation 711 may be performed prior to conversion into the MMS message to provide a notification indicating MMS conversion due to the possibility of extra fees been charged when the MMS message is transmitted.

If the MMS message is generated, the electronic device 200 may transmit the MMS message to the electronic device of the other party via a server (e.g., the server 300) in operation 715.

According to various embodiments of the present disclosure, when it is possible to resend a message in one or more message formats, the electronic device 200 may present a list of available message transmitting methods to the user and may detect a selection of a message transmitting method from the user. Furthermore, the electronic device 200 may resend the message using a selected message transmitting method. Alternatively, the electronic device 200 may convert and resend a message according to a priority order of message transmitting methods set by the user.

According to various embodiments of the present disclosure, the electronic device 200 may convert an RCS message into an SMS or MMS message and may transmit the converted message to the electronic device of the other party. More particularly, the electronic device 200 may perform an operation of conversion between different message formats as described above with reference to FIG. 5 or 7. For example, the electronic device 200 may generate an MMS protocol data unit (PDU) or an SMS PDU, and may transmit the generated MMS or SMS message to the electronic device of the other party via a multimedia message service center (MMSC) or a short message service center (SMSC) provided by a legacy network.

A message resending method according to the above-mentioned examples may have the following advantages. The electronic device 200 may send a message in RCS format based on its own RCS capability, without detecting whether the electronic device of the other party supports RCS. When the electronic device of the other party does not support RCS, the server may convert an RCS message into an SMS or MMS message through the IWF and may send the converted message to the electronic device of the other party. In such instances, some messages may be successfully sent, but the transmission of some other messages may fail. Various embodiments of the present disclosure correspond to examples for ensuring completion of message sending when message sending failure occurs. However, an SMS or MMS message delivered through a resending process according to the present disclosure have features that are different from those of an SMS or MMS message sent by the IWF of the server.

For example, a messaging application may support various functions and may include various setting information according to providers or electronic device manufacturers, but an SMS/MMS message received through the IWF may be sent without considering such setting information since data configured in accordance with the RCS protocol cannot include a setting value of an SMS/MMS message. However, when the electronic device 200 performs resending, the setting information may also be extracted from the application in operation 503 or operation 703 and may be applied when an SMS/MMS message is sent again. For example, when an initial RCS group chatting message or a group FT message is sent, it is uncertain which recipient will become a subject of TO, carbon copy (CC), or blind CC (BCC) since RCS group chatting is operated based on a chat ID, and information values corresponding to TO, CC, BCC, etc. cannot be extracted if fallback is performed by the IWF, and thus information is ignored and the message may be sent as an individual message to each user. However, when the electronic device 200 performs resending, such setting information may be obtained so that the message may be sent as a group message. For example, the electronic device 200 may determine which of chat partners of group chatting should become a subject of TO, CC, or BCC according to a predetermined setting or a user's input, and may send a fallback message.

In addition, read report, deliver report, callback number processing, signature processing, GSM alphabet or Unicode processing, and the like are not supported by the IWF, but are supported by a resending technique according to an embodiment of the present disclosure.

Figure 8:
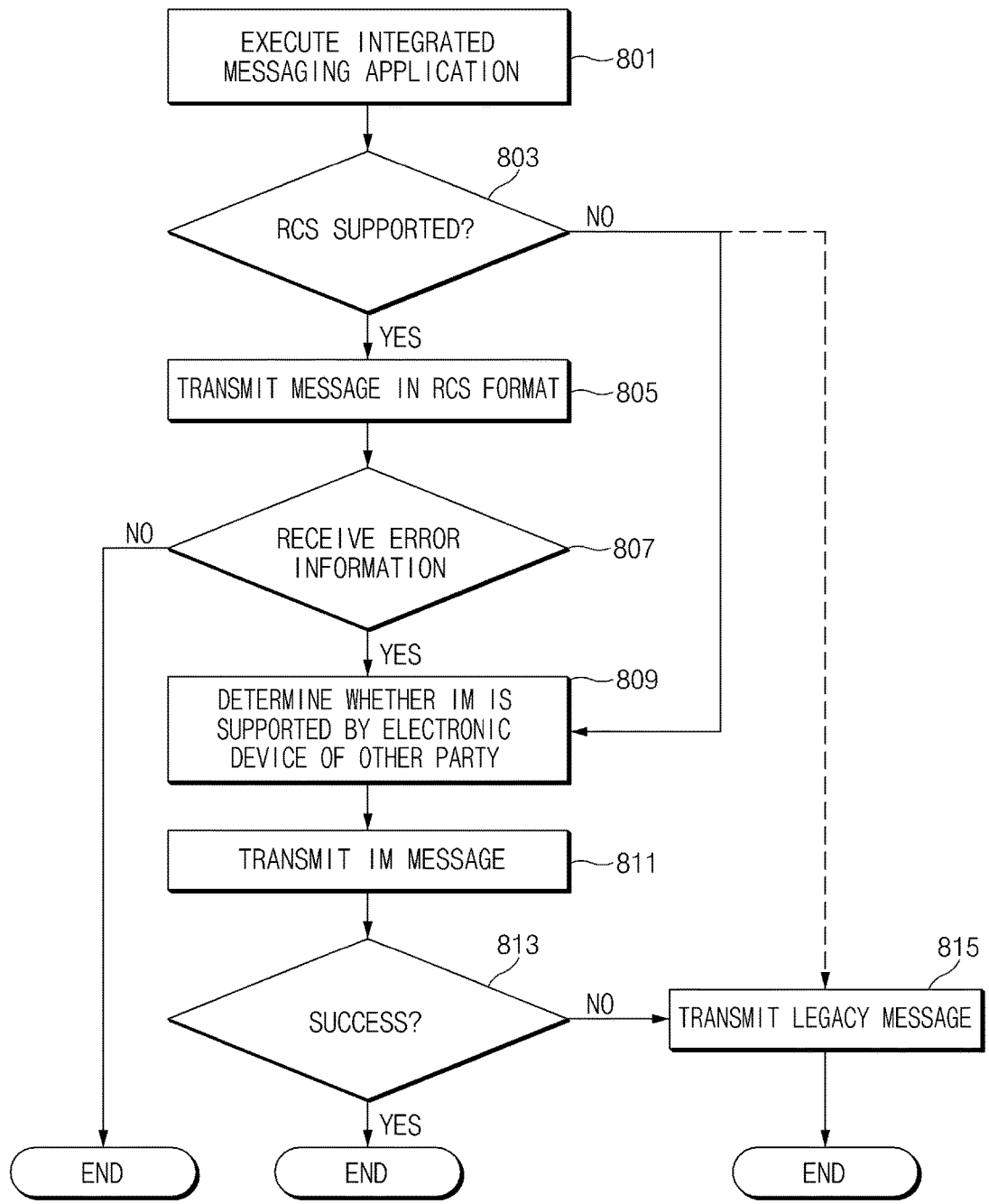
FIG. 8 is a flowchart of an example of a process, according to an embodiment of the present disclosure.

FIG. 8 is a flowchart of an example of a process, according to an embodiment of the present disclosure. In the above-mentioned examples, the electronic device 200 sends a message in RCS format, converts the message into a legacy message such as an SMS or MMS message when an error message related to the RCS transmission is received, and then performs resending. However, the electronic device 200 may also perform resending using another type of a message such as an IM message. An example is described below with reference to FIG. 8.

In operation 801, the integrated messaging application may be executed. The electronic device 200 may determine whether the electronic device 200 supports RCS in operation 803, and, if the electronic device 200 currently supports RCS, the electronic device 200 may send a message in RCS format in operation 805. If error information is not received from a network in operation 807, the process may be ended.

If the error information is received from the network in operation 807, the electronic device 200 may determine whether the electronic device of the other party supports IM messaging in operation 809. In this case, the electronic device 200 may transmit destination information (e.g., a telephone number, an account ID, an email address, etc.) to the network (e.g., a server), may determine whether the electronic device of the other party supports an IM message based on the destination information or based on the information received from the server indicating whether the other party supports the IM message or not, and may transmit an IM message to the electronic device of the other party via the network in operation 811.

According to various embodiments of the present disclosure, when there are one or more other parties with which the user is currently chatting, it may be determined whether an IM message is supported by each other party and an IM service supported by each other party may be identified, so that a message may be sent to the other parties by IM services supported thereby.

According to various embodiments of the present disclosure, when an IM service enabling transmission/reception of a message of the other party provides a VoIP service, an interface for using the VoIP service may be provided by the integrated messaging application.

If the IM message is successfully sent in operation 813, the process may be ended. However, when the IM message cannot be delivered (e.g., error information indicating message sending failure is received from the server), the electronic device 200 may attempt to send the message as a legacy message such as an SMS or MMS message in operation 815. In operation 815, to send the legacy message, the process of FIG. 5 or 7 may be used.

In the embodiment of FIG. 8, the electronic device 200 attempts to send an RCS-based message, and then attempts to send an IM-based message, and finally attempts to send an SMS/MMS message, but such a sequence may be modified according to various conditions. For example, depending on the type of available connection (e.g., a WiFi connection or a cellular connection), an SMS/MMS message sending attempt may be made prior to or after an IM message sending attempt, after an RCS message sending attempt is made.

According to various embodiments of the present disclosure, the electronic device 200 may display a received message according to a setting of an IM service. For example, when a message is received through an IM service, the integrated messaging application may hide the contents of a received message, may display only a part of the contents of the received message, or may display the contents of the received message after user authentication, according to a security setting of a corresponding IM service. Alternatively, when a display is turned off, or a screen is locked, or the integrated messaging application is running in the background, the electronic device 200 may not provide a message reception notification, may display only a part of the message, or may display the message after user authentication according to the security setting of the IM service. Alternatively, the electronic device 200 may apply a security setting of the integrated messaging application more preferentially than the security setting of the IM service.

Figure 9:
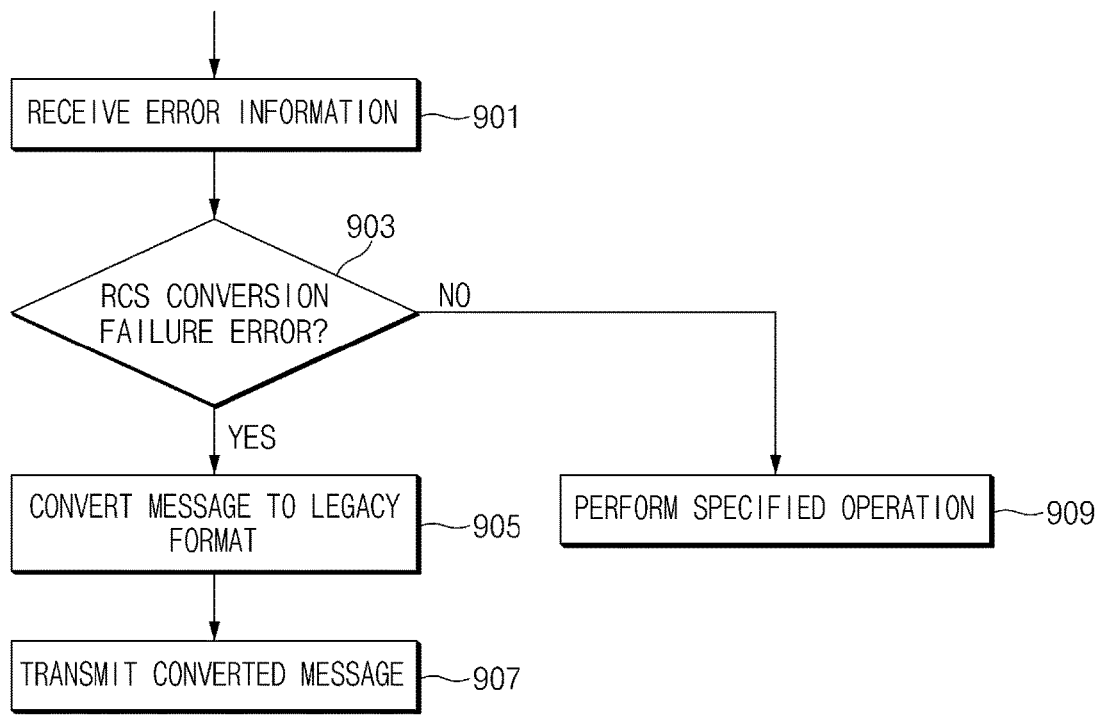
FIG. 9 is a flowchart of an example of a process, according to an embodiment of the present disclosure.

FIG. 9 is a flowchart of an example of a process, according to an embodiment of the present disclosure. Referring to FIG. 9, error information may be received from the server 300 in operation 901. The error information received in operation 901 may include the error information described with respect to operation 501 or operation 701 and other various error information that may occur. For example, the error information may include one or more error codes such as 380 Alternative Service, 400 Bad Request, 404 Not Found, 405 Method Not Allowed, 406 Not Acceptable, 408 Request Timeout, 410 Gone, 413 Request Entity Too Large, 414 Request-URI Too Large, 415 Unsupported Media Type, 420 Bad Extension, 421 Extension Required, 423 Interval Too Brief, 480 Temporarily not available, 481 Call/Transaction Does Not Exist, 482 Loop Detected, 483 Too Many Hops, 484 Address Incomplete, 485 Ambiguous, 487 Request Terminated, 488 Not Acceptable For example, 491 Request Pending, 494 Undecipherable, 494 Security Agreement Required, 501 Not Implemented, 502 Bad Gateway, 504 Server Time-out, 505 SIP Version not supported, 513 Message Too Large, 604 Does not exist anywhere, 606 Not Acceptable, etc.

For example, the electronic device 200 may receive, from the server 300, an error message "513 Message Too Large" as shown in Table 1 below. As illustrated, the error message may include a "From" field and a "To" field for identifying a sender and a recipient. Each of these fields may include a Session Initiation Protocol (SIP) SIP address corresponding to the sender and/or recipient or a Public Switch Telephone Network (PSTN) telephone number corresponding to the sender and/or recipient.

TABLE 1

SIP/2.0 513 Message Too Large
From: <tel:+491736788988>;tag=1930192994
To: <tel:+491726797522>;tag=i73bea8c-1ka1f1
Call-ID: 3822012435@10.4.134.73
CSeq: 1 INVITE
Via: SIP/2.0/TLS
10.4.134.73:5060;received=109.84.3.13 ;branch=z9hG4bK1061030381smg;transport=
TLS;rport=57382
Content-Length: 0
Server: IM-serv/OMA1.0 IMSM/v3.0_R1E01
P-Charging-Vector: icid-value=a420bf6a08b81970b0b91036d957eda7
P-Charging-Function-Addresses: ccf="aaa://mm.ims.vodafone.es:3868;transport=tcp"

In operation 903, the electronic device 200 may determine whether the error information received in operation 901 is related to an RCS message conversion failure in the server 300. In operation 905, when error information generated due to a failure to convert an RCS message into a legacy message is received, the electronic device 200 may convert the message into another type of a message using the method of FIG. 5, 7, or 8. In operation 907, the electronic device 200 may transmit a converted message.

However, when the received error information is not related to RCS, for example, when data transmitted from the electronic device 200 is lost in the server due to an unstable network environment or the electronic device of the other party designated as a recipient does not exist, the electronic device 200 may perform, as appropriate, a specified operation such as an operation of outputting a notification message related to the network environment or the other party instead of performing an operation of converting an RCS message into another type of a message and transmitting the converted message.

Figure 10:
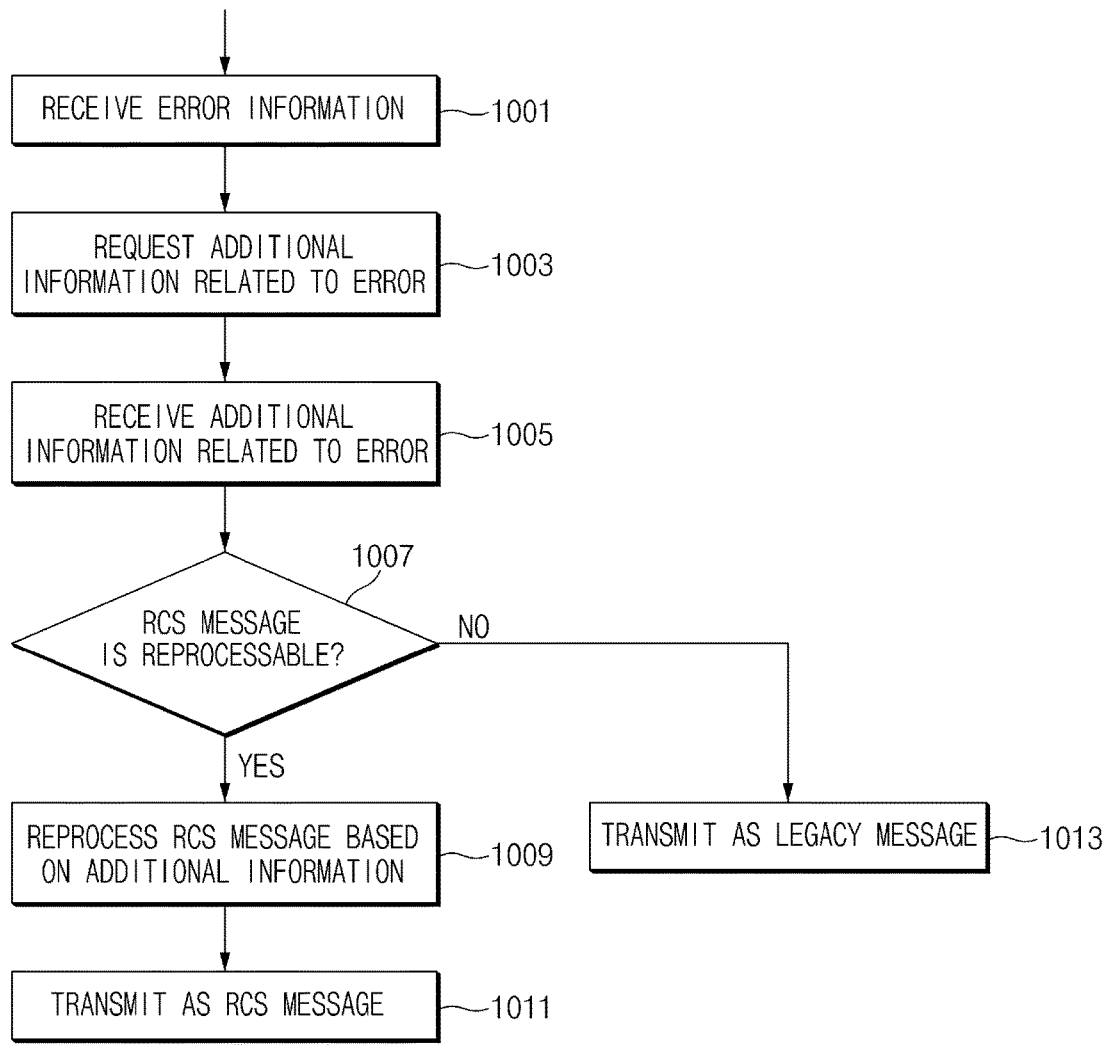
FIG. 10 is a flowchart of an example of a process, according to an embodiment of the present disclosure.

FIG. 10 is a flowchart of an example of a process, according to an embodiment of the present disclosure. More particularly, FIG. 10 illustrates an operation process of an integrated messaging application according to an embodiment of the present disclosure. After a message is sent in RCS format, if an error notification related to the message sent in RCS format is received in operation 1001, the electronic device 200 may send a request for additional information related to the received error to an RCS server in operation 1003. For example, the additional information may include a condition for conversion into a legacy message, an operation method, or an attribute of the RCS server. In operation 1005, the electronic device 200 may receive the additional information related to the error from the RCS server. In operation 1007, the electronic device 200 may determine whether the RCS message on which the error has occurred can be reprocessed into an RCS message processable by the RCS server or the IWF in the RCS server based on the additional information. According to a result of the determination in operation 1007, the electronic device 200 may reprocess the RCS message based on the additional information (operation 1009) and then may transmit the reprocessed RCS message to the RCS server (operation 1011), or may transmit a legacy message (operation 1013). The embodiment of FIG. 10 may be variously modified. For example, operation 1003 may be omitted so that operation 1005 may be performed immediately after operation 1001. In other words, even if the request for the additional information related to the error is not made by the electronic device 200, the additional information may be received from the RCS server. As another example of modification, operation 1001 and operation 1005 may be performed concurrently and operation 1003 may be omitted. Additionally or alternatively, the electronic device 200 may omit operation 1007 and perform operation 1009 only.

The above-mentioned various embodiments of the present disclosure are related to a method in which an RCS-format message is converted into another type of message and is then resent by the electronic device 200. However, in various embodiments of the present disclosure, the above-mentioned methods may be used to enhance the IWF in the RCS server or an RCS system. Relevant description is provided below with reference to FIG. 11.

Figure 11:
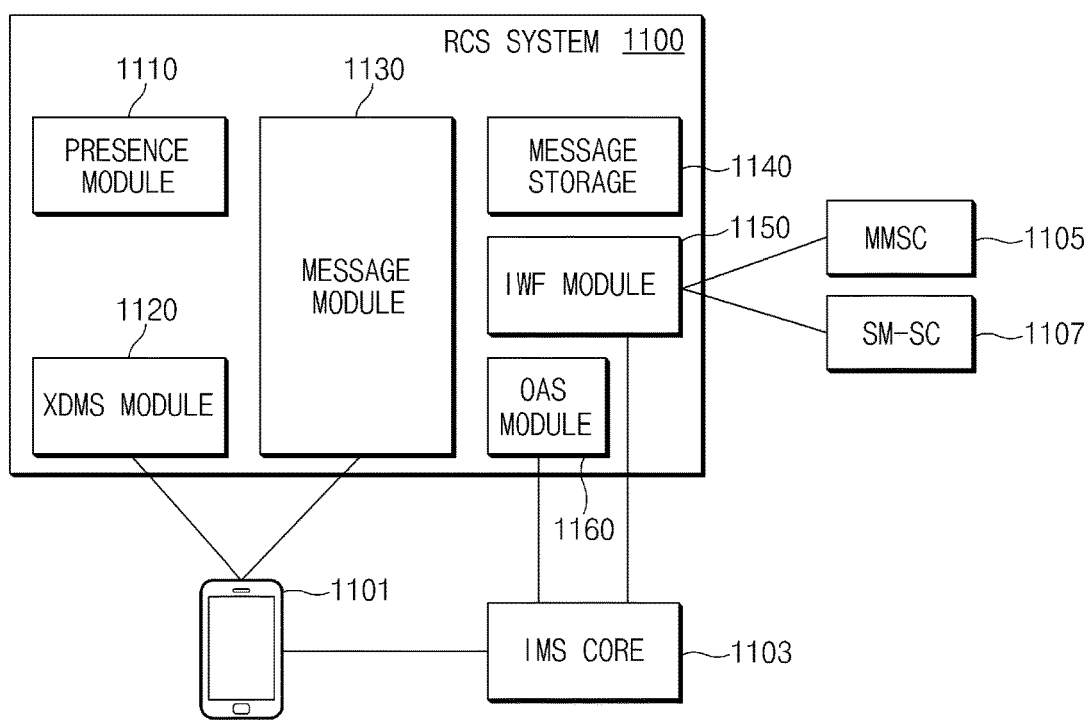
FIG. 11 is a diagram of an example of a Rich Communications Suite (RCS) system, according to an embodiment of the present disclosure.

FIG. 11 is a diagram of an example of a Rich Communications Suite (RCS) system, according to an embodiment of the present disclosure. More particularly, FIG. 11 conceptually illustrates a structure of an RCS system.

Referring to FIG. 11, an RCS system 1100 may include a presence module 1110, an XML document management server (XDMS) module 1120, a message module 1130, a message storage 1140, an IWF module 1150, and an option AS (OAS) module 1160. The RCS system 110 may include a combination of a plurality of servers or pieces of hardware, and, for example, at least a portion of the modules of FIG. 11 may be construed as a "server".

The presence module 1110 may be used for sharing service compatibility between users. The XDMS module 1120, which serves to store/manage profile information of the user and various group information, performs verification, generation, and updating of all XML documents of the user stored in an XDMS. The XDMS module 1120 may directly communicate with an electronic device 1101, and may obtain a required XML document via the presence module 1110.

The message module 1130 may handle any media or call related to IP-based chatting, file transfer, and standalone messaging. Furthermore, the message module 1130 may interwork with the IWF module 1150 in order to connect an RCS message to a legacy message service. The message module 1130 may manage message transfer between two electronic devices.

The message storage 1140 may store all messages exchanged between electronic devices, and may synchronize chat histories between a plurality of electronic devices used by the user.

The IWF module 1150 may perform association/conversion between an RCS message and a legacy message. The IWF module 1150 determines whether to map a received RCS message to SMS or MMS based on the size and content type of the RCS message. For example, the IWF module 1150 may interwork with an IMS core 1103 or may communicate with an SM-SC 1107 for the purpose of SMS interworking. When the RCS message is mapped to the MMS, the IWF module 1150 may interwork with an MMSC 1105 or the IMS core 1103. Meanwhile, the OAS module 1160 may perform capability discovery on a multi-device, and may handle session initiation protocol (SIP) options.

The embodiments described above with reference to FIGS. 3 to 10 may be applied to the RCS system of FIG. 11. For example, although it is described above that the RCS system 1100 converts the RCS message received from the electronic device 1101 into an MMS or SMS message in order to send the message to another electronic device, the message may fail to be converted due to the size, the content type, or the like of the message. In the case of conversion failure, the RCS system 1103 may perform operations 503 to 517 of FIG. 5 so as to convert the RCS message into an MMS message. However, such an operation may be performed without being recognized by the user of the electronic device 1101 or may be performed in a manner not intended by the user. Therefore, the RCS system 1100 may transmit an appropriate notification to the electronic device 1101 as illustrated in FIG. 6A or 6B.

Figure 12:
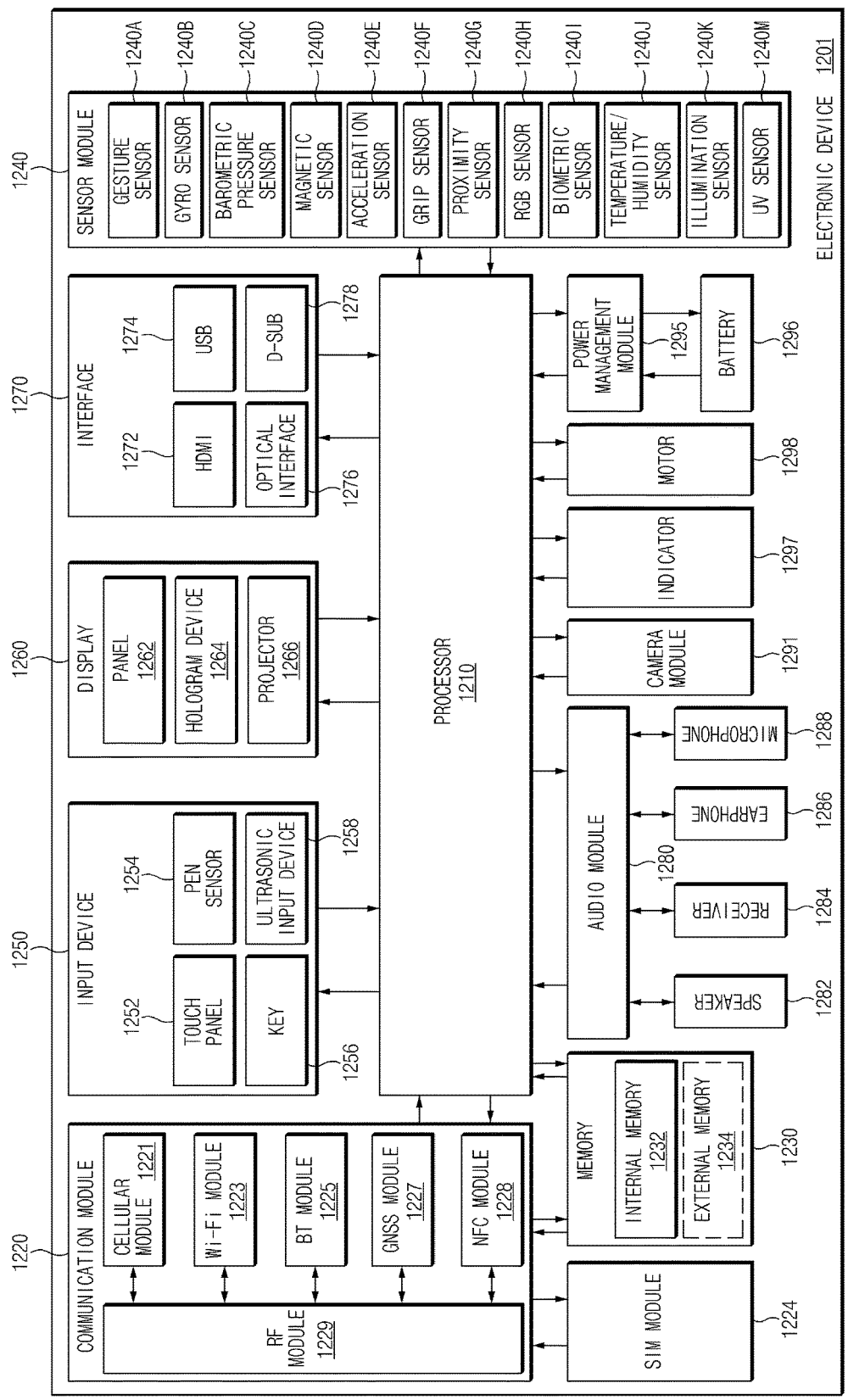
FIG. 12 is a block diagram of an example of an electronic device, according to an embodiment of the present disclosure.

FIG. 12 is a block diagram of an example of an electronic device 1201, according to various embodiments of the present disclosure. The electronic device 1201 may include, for example, a part or the entirety of the electronic device 200 illustrated in FIG. 2. The electronic device 1201 may include at least one processor (e.g., an application processor (AP)) 1210, a communication module 1220, a subscriber identity module 1224, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may run an operating system or an application program so as to control a plurality of hardware or software elements connected to the processor 1210, and may process various data and perform operations. The processor 1210 may be implemented with, for example, a system on chip (SoC). According to an embodiment of the present disclosure, the processor 1210 may further include a graphic processing unit (GPU) and/or an image signal processor. The processor 1210 may include at least a portion (e.g., the cellular module 1221) of the elements illustrated in FIG. 12. The processor 1210 may load, in a volatile memory, an instruction or data received from at least one of other elements (e.g., a nonvolatile memory) to process the instruction or data, and may store various data in a nonvolatile memory.

The communication module 1220 may have a configuration that is the same as or similar to that of the communication unit 260 of FIG. 2. The communication module 1220 may include, for example, a cellular module 1221, a Wi-Fi module 1223, a Bluetooth module 1225, a GNSS module 1227 (e.g., a GPS module, a GLONASS module, a BeiDou module, or a Galileo module), a near field communication (NFC) module 1228, and a radio frequency (RF) module 1229.

The cellular module 1221 may provide, for example, a voice call service, a video call service, a text message service, or an Internet service through a communication network. According to an embodiment of the present disclosure, the cellular module 1221 may identify and authenticate the electronic device 1201 in the communication network using the subscriber identity module 1224 (e.g., a SIM card). According to an embodiment of the present disclosure, the cellular module 1221 may perform at least a part of functions provided by the processor 1210. According to an embodiment of the present disclosure, the cellular module 1221 may include a communication processor (CP).

Each of the Wi-Fi module 1223, the BT module 1225, the GNSS module 1227, and the NFC module 1228 may include, for example, a processor for processing data transmitted/received through the modules. According to some various embodiments of the present disclosure, at least a portion (e.g., at least two) of the cellular module 1221, the Wi-Fi module 1223, the BT module 1225, the GPS module 1227, and the NFC module 1228 may be included in a single integrated chip (IC) or IC package.

The RF module 1229 may transmit/receive, for example, communication signals (e.g., RF signals). The RF module 1229 may include, for example, a transceiver, a power amp module (PAM), a frequency filter, a low noise amplifier (LNA), an antenna, or the like. According to another embodiment of the present disclosure, at least one of the cellular module 1221, the Wi-Fi module 1223, the BT module 1225, the GPS module 1227, or the NFC module 1228 may transmit/receive RF signals through a separate RF module.

The subscriber identity module 1224 may include, for example, an embedded SIM and/or a card containing a subscriber identity module, and may include unique identification information (e.g., an integrated circuit card identifier (ICCID)) or subscriber information (e.g., international mobile subscriber identity (IMSI)).

The memory 1230 (e.g., the memory 230) may include an internal memory 1232 or an external memory 1234. The internal memory 1232 may include at least one of a volatile memory (e.g., a dynamic RAM (DRAM), a static RAM (SRAM), a synchronous dynamic RAM (SDRAM), or the like) or a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like), a hard drive, or a solid-state drive (SSD)).

The external memory 1234 may include a flash drive, for example, compact flash (CF), secure digital (SD), micro secure digital (Micro-SD), mini secure digital (Mini-SD), extreme digital (xD), multi-media card (MMC), a memory stick, or the like. The external memory 1234 may be operatively and/or physically connected to the electronic device 1201 through various interfaces.

The sensor module 1240 may, for example, measure a physical quantity or detect an operation state of the electronic device 1201 so as to convert measured or detected information into an electrical signal. The sensor module 1240 may include, for example, at least one of a gesture sensor 1240A, a gyro sensor 1240B, a barometric pressure sensor 1240C, a magnetic sensor 1240D, an acceleration sensor 1240E, a grip sensor 1240F, a proximity sensor 1240G, a color sensor 1240H (e.g., a red/green/blue (RGB) sensor), a biometric sensor 1240I, a temperature/humidity sensor 1240J, an illumination sensor 1240K, or an ultraviolet (UV) sensor 1240M. Additionally or alternatively, the sensor module 1240 may include, for example, an olfactory sensor (E-nose sensor), an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling at least one sensor included therein. In some various embodiments of the present disclosure, the electronic device 1201 may further include a processor configured to control the sensor module 1240 as a part of the processor 1210 or separately, so that the sensor module 1240 is controlled while the processor 1210 is in a sleep state.

The input device 1250 may include, for example, a touch panel 1252, a (digital) pen sensor 1254, a key 1256, or an ultrasonic input device 1258. The touch panel 1252 may employ at least one of capacitive, resistive, infrared, and ultraviolet sensing methods. The touch panel 1252 may further include a control circuit. The touch panel 1252 may further include a tactile layer so as to provide tactile reaction to a user.

The (digital) pen sensor 1254 may include, for example, a sheet for recognition which is a part of a touch panel or is separate. The key 1256 may include, for example, a physical button, an optical button, or a keypad. The ultrasonic input device 1258 may sense ultrasonic waves generated by an input tool through a microphone (e.g., a microphone 1288) so as to identify data corresponding to the ultrasonic waves sensed.

The display 1260 (e.g., the display 250) may include a panel 1262, a hologram device 1264, or a projector 1266. The panel 1262 may have a configuration that is the same as or similar to that of the display 250 of FIG. 2. The panel 1262 may be, for example, flexible, transparent, or wearable. The panel 1262 and the touch panel 1252 may be integrated into a single module. The hologram device 1264 may display a stereoscopic image in a space using a light interference phenomenon. The projector 1266 may project light onto a screen so as to display an image. The screen may be disposed on the inside or outside of the electronic device 1201. According to an embodiment of the present disclosure, the display 1260 may further include a control circuit for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature (D-sub) 1278. Additionally or alternatively, the interface 1270 may include, for example, a mobile high-definition link (MHL) interface, a secure digital (SD) card/multi-media card (MMC) interface, or an infrared data association (IrDA) interface.

The audio module 1280 may convert, for example, a sound into an electrical signal or vice versa. At least a portion of elements of the audio module 1280 may be included in the input unit 240 illustrated in FIG. 2. The audio module 1280 may process sound information input or output through a speaker 1282, a receiver 1284, an earphone 1286, or the microphone 1288.

According to an embodiment of the present disclosure, the camera module 1291 for shooting a still image or a video may include, for example, at least one image sensor (e.g., a front sensor or a rear sensor), a lens, an image signal processor (ISP), or a flash (e.g., an LED or a xenon lamp).

The power management module 1295 may manage the power supply of the electronic device 1201. According to an embodiment of the present disclosure, the power management module 1295 may include a power management integrated circuit (PMIC), a charger integrated circuit (IC), or a battery or fuel gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, or the like. The motor 1298 may convert an electrical signal into a mechanical vibration, and may generate a vibration or haptic effect. Although not illustrated, a processing device (e.g., a GPU) for supporting a mobile TV may be included in the electronic device 1201. The processing device for supporting a mobile TV may process media data according to the standards of digital multimedia broadcasting (DMB), digital video broadcasting (DVB), Media-FLO™, or the like. Each of the elements described herein may be configured with one or more components, and the names of the elements may be changed according to the type of an electronic device. In various embodiments of the present disclosure, an electronic device may include at least one of the elements described herein, and some elements may be omitted, or other additional elements may be added. Furthermore, some of the elements of the electronic device according to various embodiments of the present disclosure may be combined with each other so as to form one entity, so that the functions of the elements may be performed in the same manner as before the combination.

The electronic device 1201 according to an embodiment of the present disclosure may include the display 1260, the (wireless) communication module 1220, the processor 1210 electrically connected to the display 1260 and the communication module 1220, and the memory 1230 electrically connected to the processor 1210. The memory 1230 may store a messaging application and may store instructions that cause the processor 1210 to perform various embodiments of the present disclosure. For example, the memory 1230 may store instructions that cause the processor 1210 to display, on the display, a user interface of the messaging application, receive an input related to a destination telephone number, send a first message via the communication module using the destination telephone number and a first protocol, receive, via the communication module, an error message related to transmission failure of the first message, and send a second message including content, at least a part of which is the same as the first message, via the communication module using the destination telephone number and a second protocol different from the first protocol.

For example, the protocols may represent communication protocols predefined with respect to a message transmission method. For example, the first protocol may include an RCS protocol, and the second protocol may include an SMS protocol or an MMS protocol. In an embodiment of the present disclosure, the second protocol may correspond to an IM protocol.

In an embodiment of the present disclosure, the communication module 1220 may transmit the first message (e.g., an RCS message) to a first server (e.g., an RCS server), and may receive the error message related to the transmission failure from the first server. In this case, the communication module 1220 may transmit the second message (e.g., an SMS/MMS/IM message) to a second server different from the first server. However, in another embodiment of the present disclosure, when the first server is capable of handling message transmission/reception according to respective communication protocols, the communication module 1220 may also transmit the second message to the first server.

In addition, for example, the memory 1230 may further instructions that cause the processor 1210 to receive a setting change or an input for requesting the messaging application to use the first protocol before sending the first message. In various embodiments of the present disclosure, the memory 1230 may store instructions for performing the operations or functions described above with reference to FIGS. 2 to 12. For example, in the above description, that the processor 220 performs operation A may indicate that instructions for performing operation A are stored in the memory 230.

Figure 13:
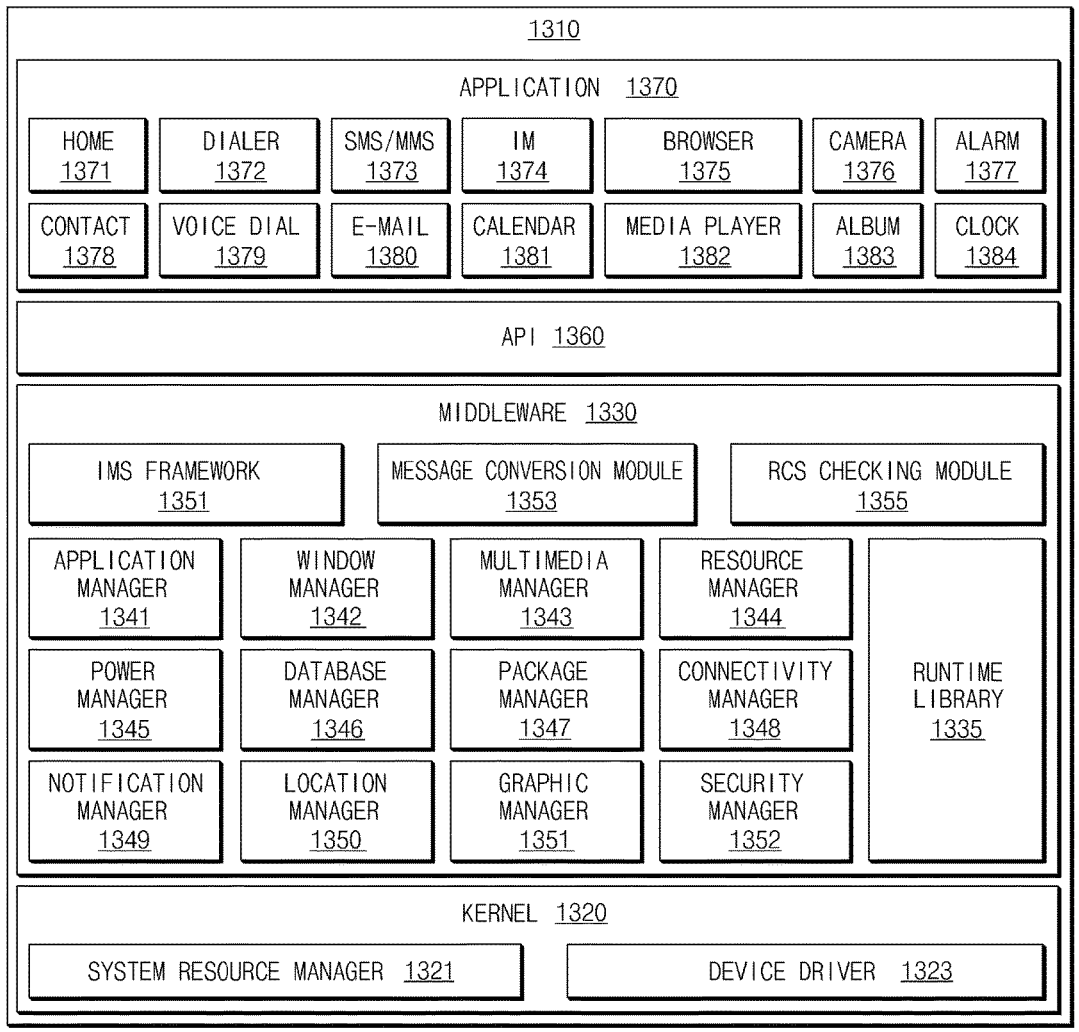
FIG. 13 is a block diagram of an example of a program module, according to an embodiment of the present disclosure.

FIG. 13 is a block diagram of an example of a program module, according to an embodiment of the present disclosure. According to an embodiment of the present disclosure, a program module 1310 may include an operating system (OS) for controlling a resource related to an electronic device (e.g., the electronic device 200) and/or various applications running on the OS. The operating system may be, for example, Android, iOS, Windows, Symbian, Tizen, Bada, or the like.

The program module 1310 may include a kernel 1320, a middleware 1330, an application programming interface (API) 1360, and/or an application 1370. At least a part of the program module 1310 may be preloaded on the electronic device or may be downloaded from an external electronic device.

The kernel 1320 may include, for example, a system resource manager 1321 and/or a device driver 1323. The system resource manager 1321 may perform control, allocation, or retrieval of a system resource. According to an embodiment of the present disclosure, the system resource manager 1321 may include a process management unit, a memory management unit, a file system management unit, or the like. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330, for example, may provide a function that the applications 1370 require in common, or may provide various functions to the applications 1370 through the API 1360 so that the applications 1370 may efficiently use limited system resources in the electronic device. According to an embodiment of the present disclosure, the middleware 1330 may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, or a security manager 1352.

Furthermore, the middleware 1330 may include an IMS framework 1351, a message conversion module 1353, and an RCS checking module 1355. In an embodiment of the present disclosure, the IMS framework 1351, the message conversion module 1353, or the RCS checking module 1355 may belong to the applications 1370.

The runtime library 1335 may include, for example, a library module that a compiler uses to add a new function through a programming language while the application 1370 is running. The runtime library 1335 may perform a function for input/output management, memory management, or an arithmetic function.

The application manager 1341 may manage, for example, a life cycle of at least one of the applications 1370. The window manager 1342 may manage various GUI resources. The multimedia manager 1343 may recognize a format required for playing various media files and may encode or decode a media file using a codec matched to the format. The resource manager 1344 may manage a resource such as a source code, a memory, or a storage space of at least one of the applications 1370.

The power manager 1345, for example, may operate together with a basic input/output system (BIOS) to manage a battery or power and may provide power information required for operating the electronic device. The database manager 1346 may generate, search, or modify a database to be used in at least one of the applications 1370. The package manager 1347 may manage installation or update of an application distributed in a package file format.

The connectivity manager 1348 may manage wireless connection of Wi-Fi, Bluetooth, or the like. The notification manager 1349 may display or notify an event such as message arrival, appointments, and proximity alerts in such a manner as not to disturb a user. The location manager 1350 may manage location information of the electronic device. The graphic manager 1351 may manage a graphic effect to be provided to a user or a user interface related thereto. The security manager 1352 may provide various security functions required for system security or user authentication. According to an embodiment of the present disclosure, when an electronic device (e.g., the electronic device 200) includes a phone function, the middleware 1330 may further include a telephony manager for managing a voice or video call function of the electronic device.

The middleware 1330 may include a middleware module for forming a combination of various functions of the above-mentioned elements. The middleware 1330 may provide a module specialized for each type of an operating system to provide different functions. Furthermore, the middleware 1330 may delete a part of existing elements or may add new elements dynamically.

The API 1360 which is, for example, a set of API programming functions may be provided in different configurations according to an operating system. For example, in the case of Android or iOS, one API set may be provided for each platform, and, in the case of Tizen, at least two API sets may be provided for each platform.

The application 1370, for example, may include at least one application for providing functions such as a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, a clock 1384, healthcare (e.g., measure an exercise amount or blood sugar), or environmental information provision (e.g., provide air pressure, humidity, or temperature information). The message writing module may include the SMS/MMS 1373 or the IM 1374.

According to an embodiment of the present disclosure, the application 1370 may include an application (hereinafter referred to as an "information exchange application") for supporting information exchange between the electronic device (e.g., the electronic device 200) and an external electronic device. The information exchange application may include, for example, a notification relay application for relaying specific information to the external electronic device or a device management application for managing the external electronic device.

For example, the notification relay application may have a function of relaying, to an external electronic device, notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn-off of an external electronic device itself (or some elements) or the brightness (or resolution) adjustment of a display) of the external electronic device communicating with the electronic device, an application running in the external electronic device, or a service (e.g., a call service or a message service) provided by the external electronic device.

According to an embodiment of the present disclosure, the application 1370 may include a specified application (e.g., a healthcare application of a mobile medical device) according to an attribute of the external electronic device. According to an embodiment of the present disclosure, the application 1370 may include an application received from the external electronic device. According to an embodiment of the present disclosure, the application 1370 may include a preloaded application or a third-party application downloadable from a server. The names of the elements of the program module 1310 illustrated may vary with the type of an operating system.

According to various embodiments of the present disclosure, at least a part of the program module 1310 may be implemented with software, firmware, hardware, or a combination thereof. At least a part of the program module 1310, for example, may be implemented (e.g., executed) by a processor (e.g., the processor 1210). At least a part of the program module 1310 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored on a computer-readable storage medium in the form of a program module. When the instructions are performed by a processor (e.g., the processor 220), the processor may perform functions corresponding to the instructions. The computer-readable storage medium may be, for example, the memory 230.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, IMS-based chat message, FT message, and legacy message services may be provided through the same UI. Furthermore, when a message initially sent from a transmitting-side electronic device fails to be delivered due to various reasons such as a state of a receiving-side electronic device or a network state, the transmitting-side electronic device may determine an appropriate alternative communication method, may reprocess the message/attached content, and may transmit the reprocessed message/attached content. Accordingly, completion of message delivery may be ensured.

FIGS. 1-13 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A mobile terminal comprising:
   a display;
   a transceiver;
   a memory;
   at least one processor operatively coupled to the memory, configured to:
     display, on the display, a user interface of a messaging application;
     detect an input indicating a destination telephone number;
     transmit by the mobile terminal, via the transceiver, a first message comprising a first content by using the destination telephone number and a first protocol;
     receive by the mobile terminal, via the transceiver, an error message indicating a transmission failure of the first message, after transmitting the first message;
     responsive to receiving the error message:
       convert the first content to second content using a second protocol different from the first protocol; and
       retransmit by the mobile terminal, via the transceiver, a second message comprising the second content, by using the destination telephone number and the second protocol.

2. The mobile terminal of claim 1, wherein the first protocol comprises a Rich Communication Suite (RCS) protocol, and the second protocol comprises a Short Messaging Service (SMS) protocol or a Multimedia Messaging Service (MMS) protocol.

3. The mobile terminal of claim 2, wherein the second protocol includes the MMS protocol when the first message includes a file transfer (FT) message and the first protocol includes the RCS protocol.

4. The mobile terminal of claim 3, wherein, when a size of a file included in the FT message is larger than an allowable file size of an MMS message, the mobile terminal generates the second message by performing at least one of compressing, splitting, or changing a resolution associated with the file.

5. The mobile terminal of claim 2, wherein, when the first message includes a chat message and the first protocol includes the RCS protocol, the second message is generated by converting the chat message into an SMS message or an MMS message.

6. The mobile terminal of claim 5, wherein:
   when a size of the chat message is larger than a maximum SMS message size, the second message is generated by converting the chat message into the MMS message, and
   when the size of the chat message is not larger than the maximum SMS message size, the second message is generated by converting the chat message into the SMS message.

7. The mobile terminal of claim 1, wherein:
   the first message is transmitted to a first server,
   the error message is received from the first server, and
   the second message is transmitted to a second server that is different from the first server.

8. The mobile terminal of claim 1, wherein the at least one processor is further configured to detect at least one of a setting change request or a request to use the first protocol for sending the first message.

9. The mobile terminal of claim 1, wherein the at least one processor is further configured to:
   obtain setting information associated with the first message from the messaging application; and
   generate the second message based on the setting information.

10. The mobile terminal of claim 1, where the at least one processor is configured to display a popup message notifying the user that the message is converted to the second protocol.

11. The mobile terminal of claim 10, wherein popup message includes a confirmation, and wherein the second message is retransmitted in response to a user input selecting the confirmation.

12. A method for use in mobile terminal, comprising:
   transmitting a first message to an external electronic device, wherein the first message includes a Rich Communication Suite (RCS) message defined by a first protocol;
   receiving, by the mobile terminal, an error message indicating a transmission failure of the first message, after transmitting the first message;
   determining whether the transmission failure was due to a conversion failure;
   responsive to determining that the transmission failure was due to a conversion failure:
     converting, by the mobile terminal, the RCS message to at least one of a multimedia messaging service (MMS) message or a short messaging service (SMS) message defined by a second protocol different from the first protocol; and
     retransmitting the second message including the at least one of the MMS message or the SMS message to the external device by using the second protocol.

13. The method of claim 12, wherein the RCS message is converted into a multimedia messaging service (MMS) message when the RCS message includes a file transfer (FT) message.

14. The method of claim 13, wherein the converting the RCS message into the MMS message comprises:
   extracting destination information and content from the first message; and
   performing at least one of a compressing, a splitting, or a resolution change on the content when a file size of the content is larger than a maximum size of the MMS message.

15. The method of claim 13, wherein converting the RCS message comprises:
   extracting destination information and content from the first message; and
   changing an extension associated with the content when a type of the content is not supported by an MMS protocol.

16. The method of claim 12, wherein converting the RCS message comprises:

converting the RCS message into the MMS message when a size of the first message is larger than a threshold size that is associated with the SMS message; and converting the RCS message into the SMS message when the size of the first message is not larger than the threshold size.

17. The method of claim 12, wherein detecting whether the transmission failure was due to a conversion failure comprises examining an error code.

18. The method of claim 17, wherein detecting whether the transmission failure was due to a conversion failure comprises determining whether the error code is associated with the size of the first message being too large.

* * * * *